April 10, 1934. J. I. BELLAMY 1,953,918
CRYPTOGRAPHIC SYSTEM AND APPARATUS
Filed March 28, 1932 12 Sheets-Sheet 1
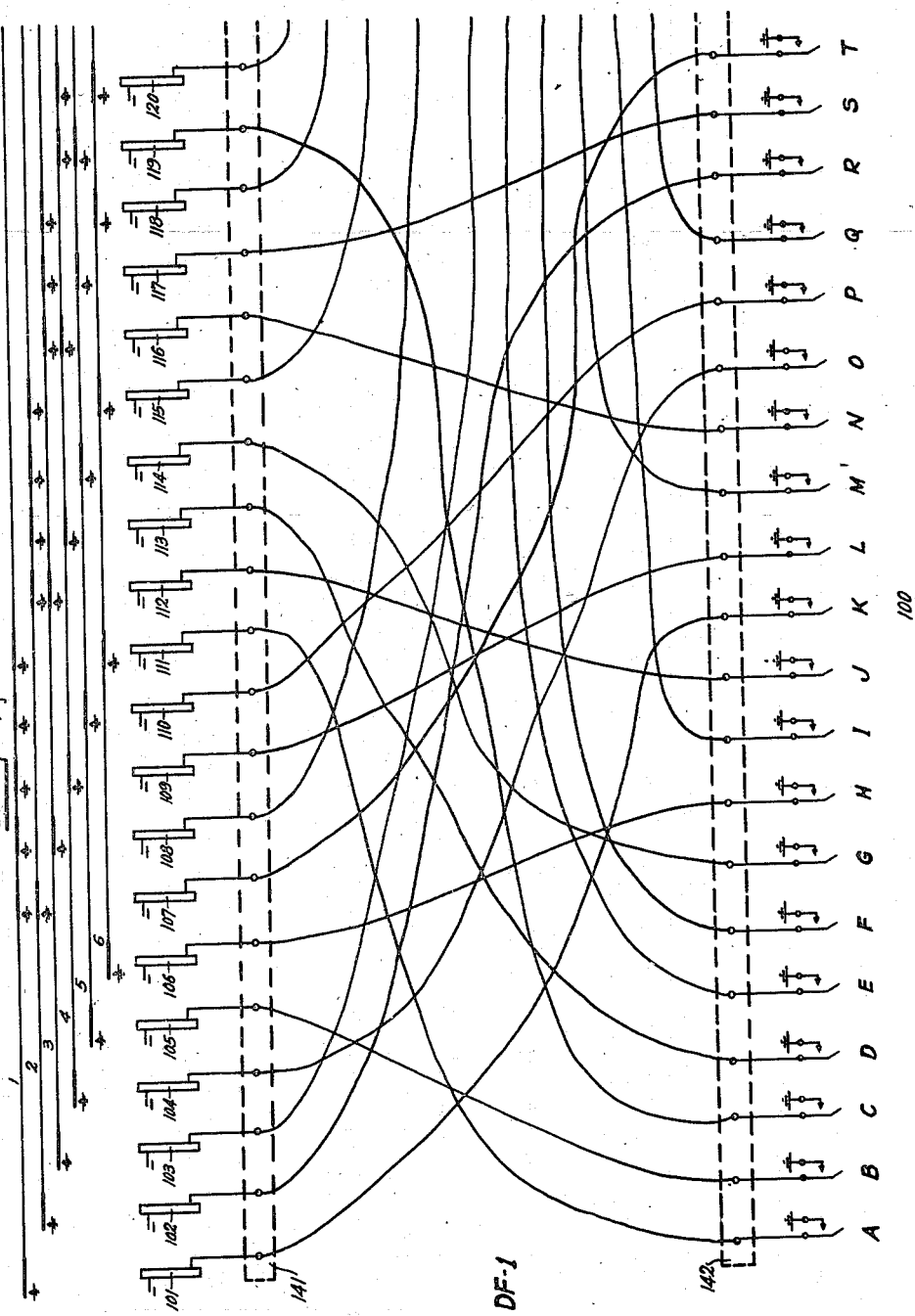
Inventor
John I. Bellamy
Atty.

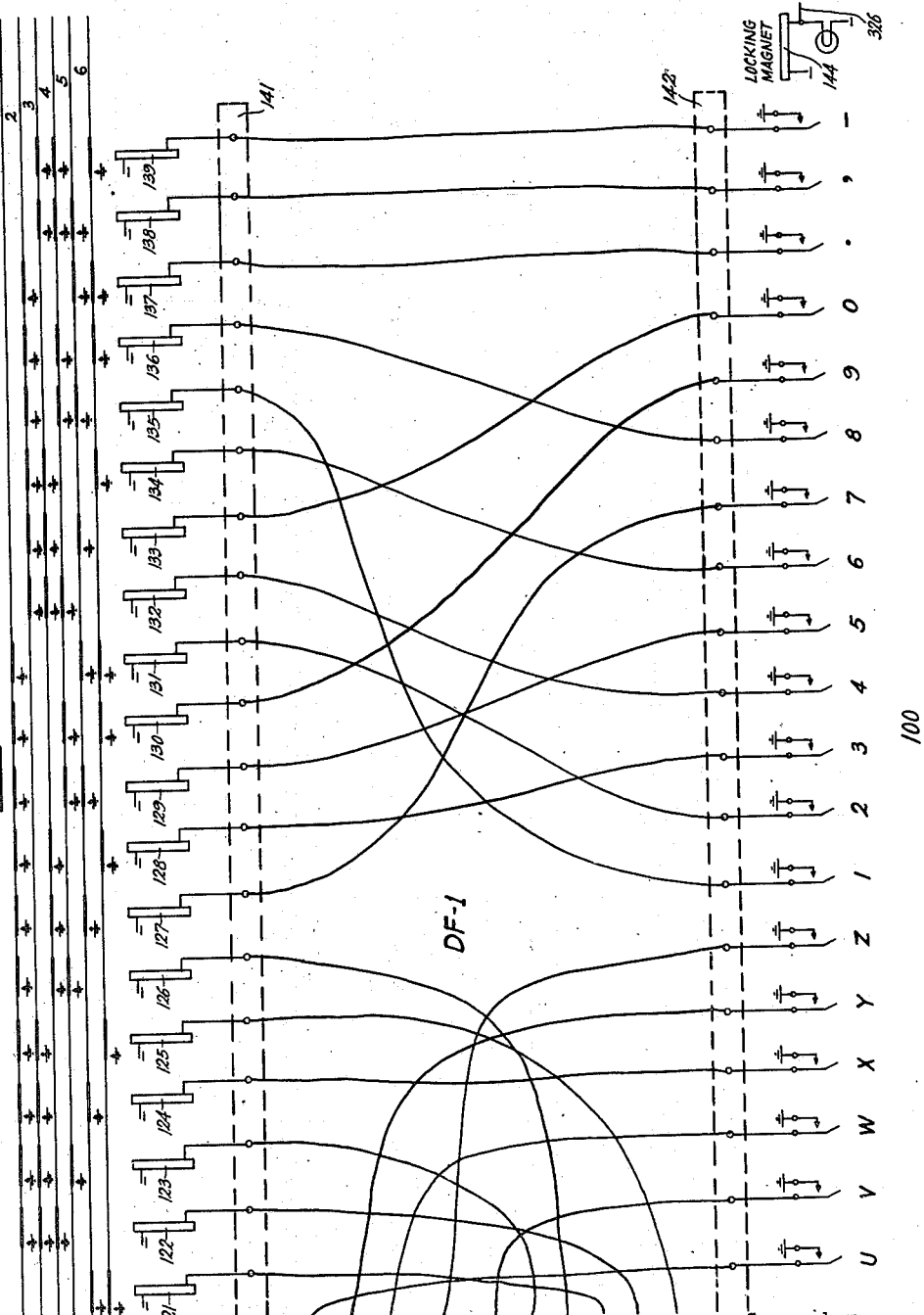

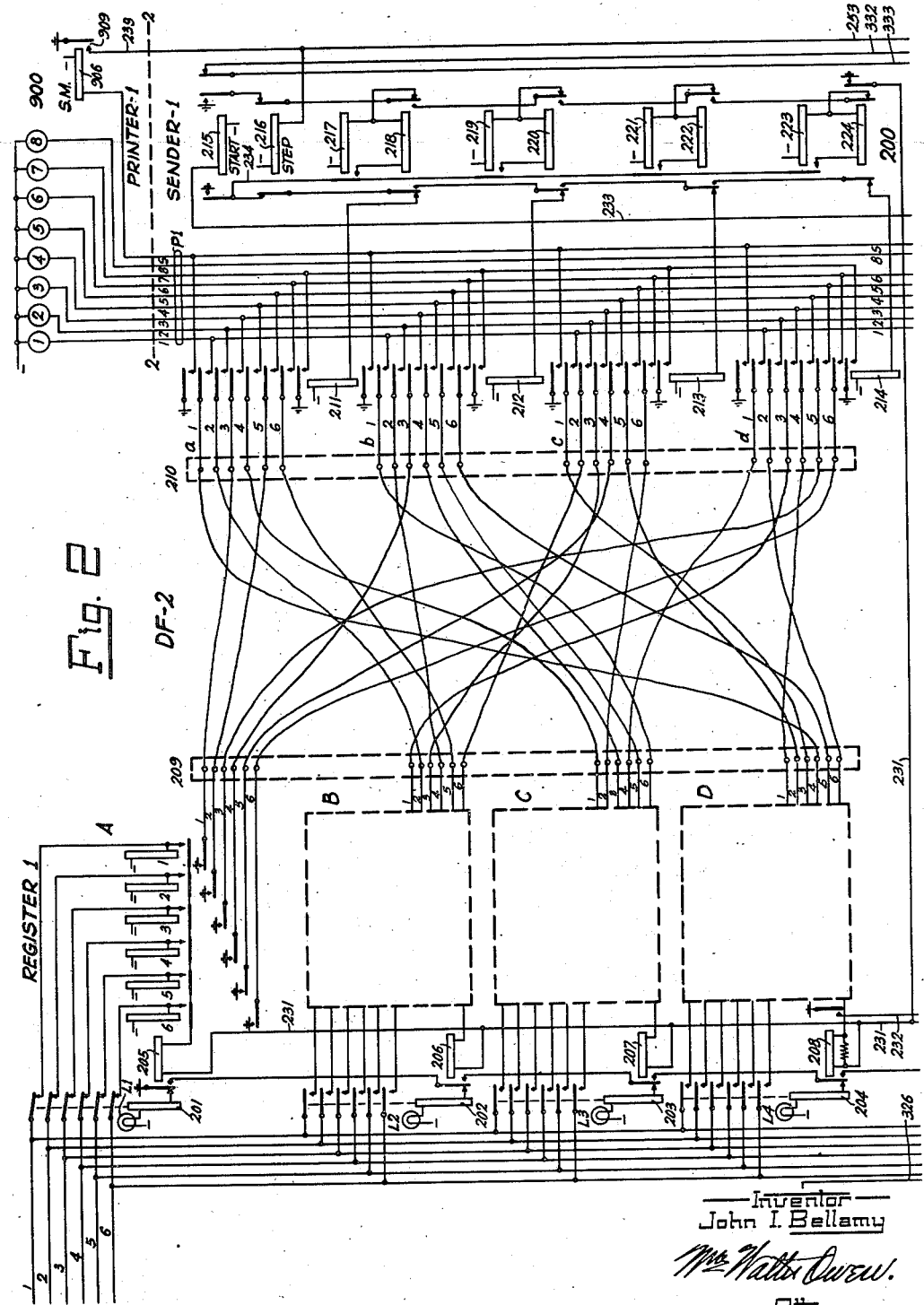

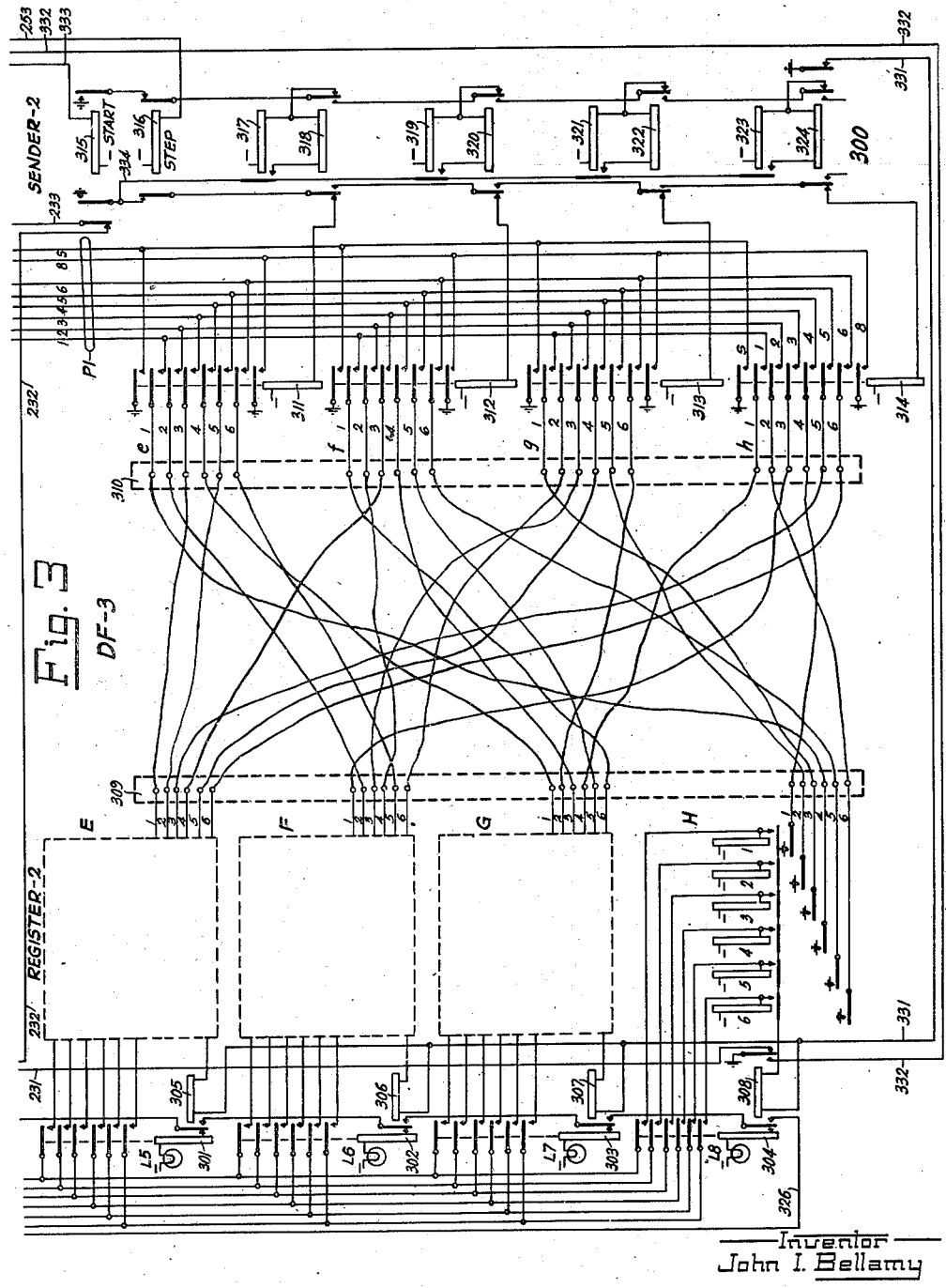

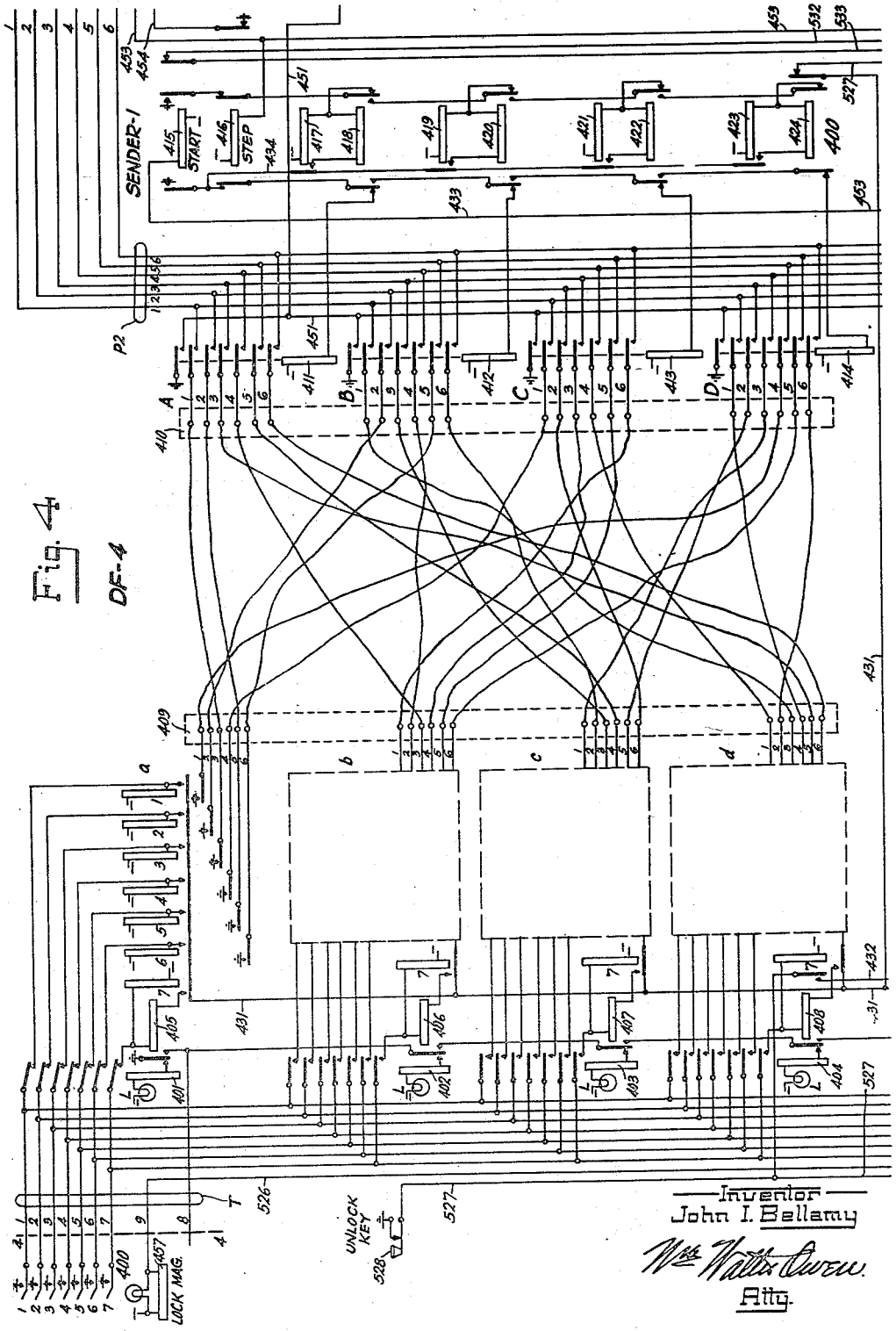

April 10, 1934.  J. I. BELLAMY  1,953,918
CRYPTOGRAPHIC SYSTEM AND APPARATUS
Filed March 28, 1932   12 Sheets-Sheet 6
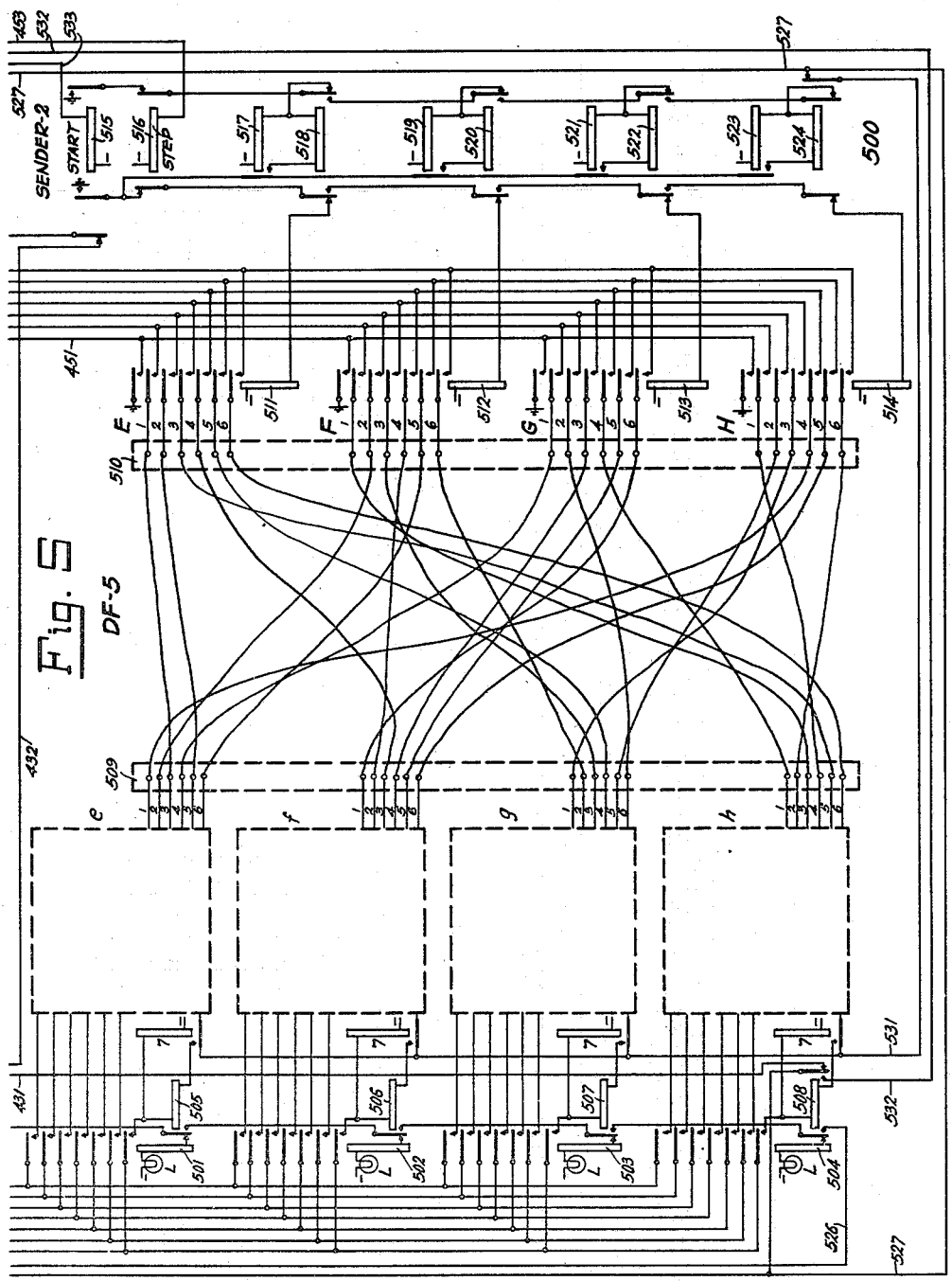
Inventor
John I. Bellamy
Atty.

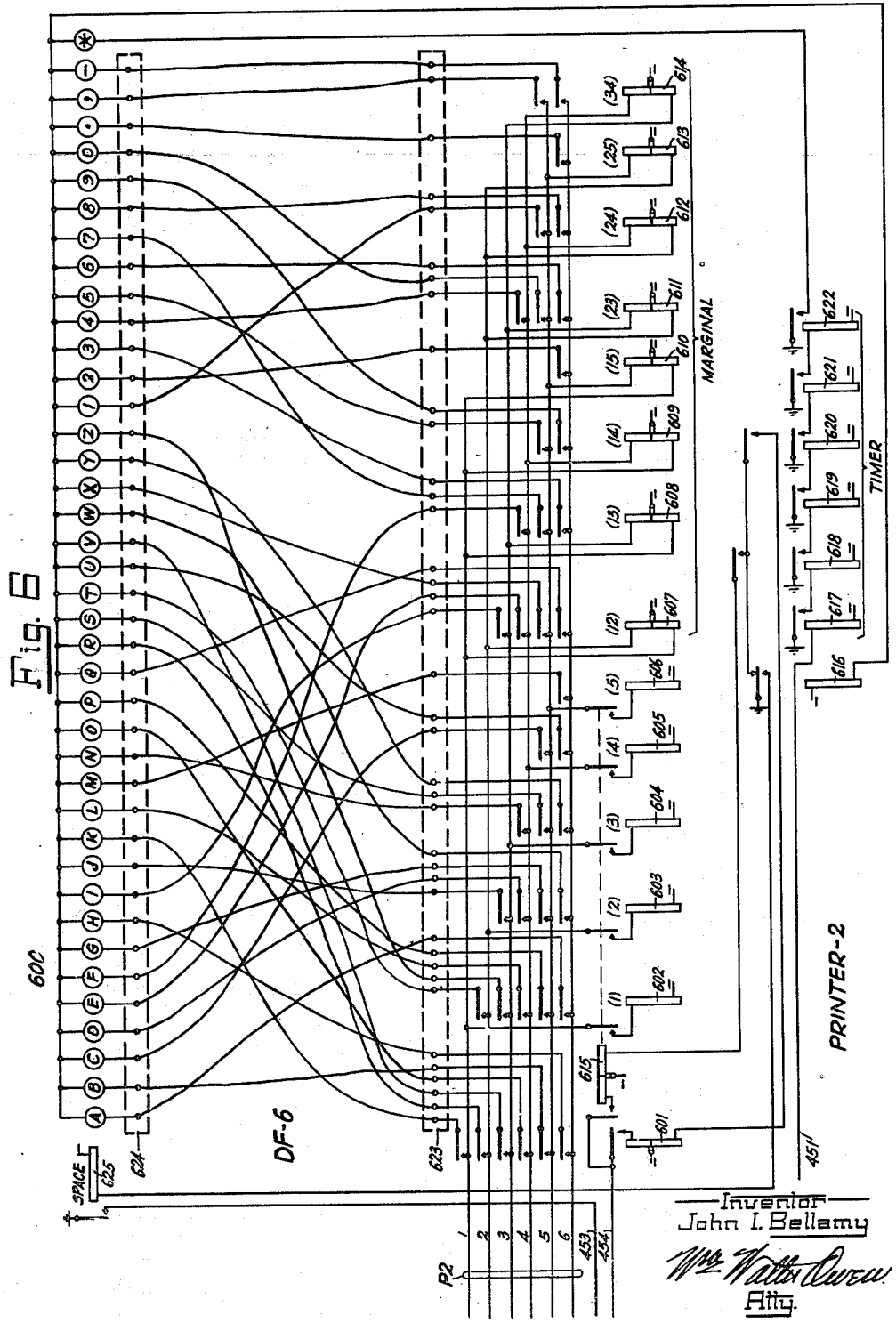

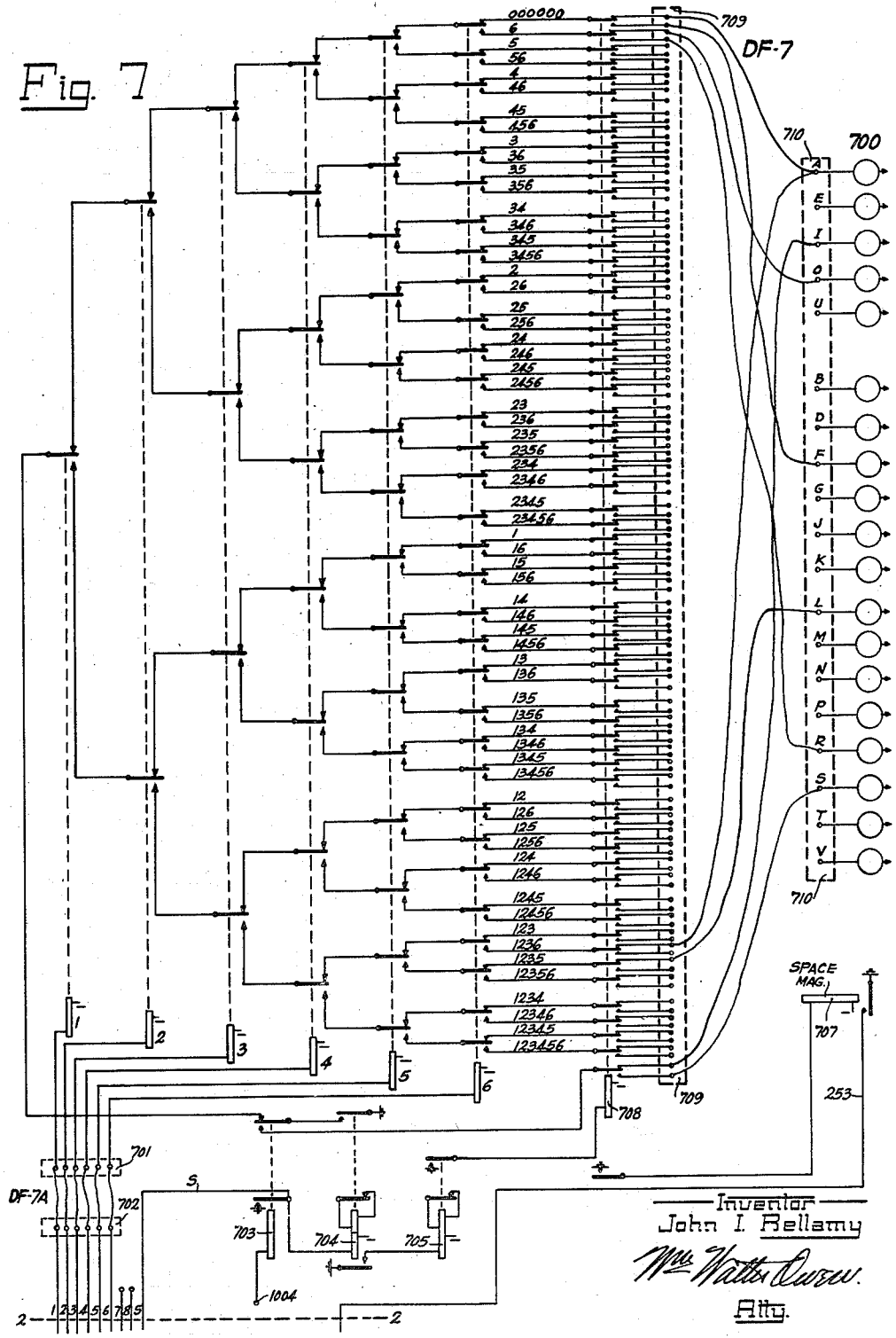

April 10, 1934.   J. I. BELLAMY   1,953,918
CRYPTOGRAPHIC SYSTEM AND APPARATUS
Filed March 28, 1932   12 Sheets-Sheet 9
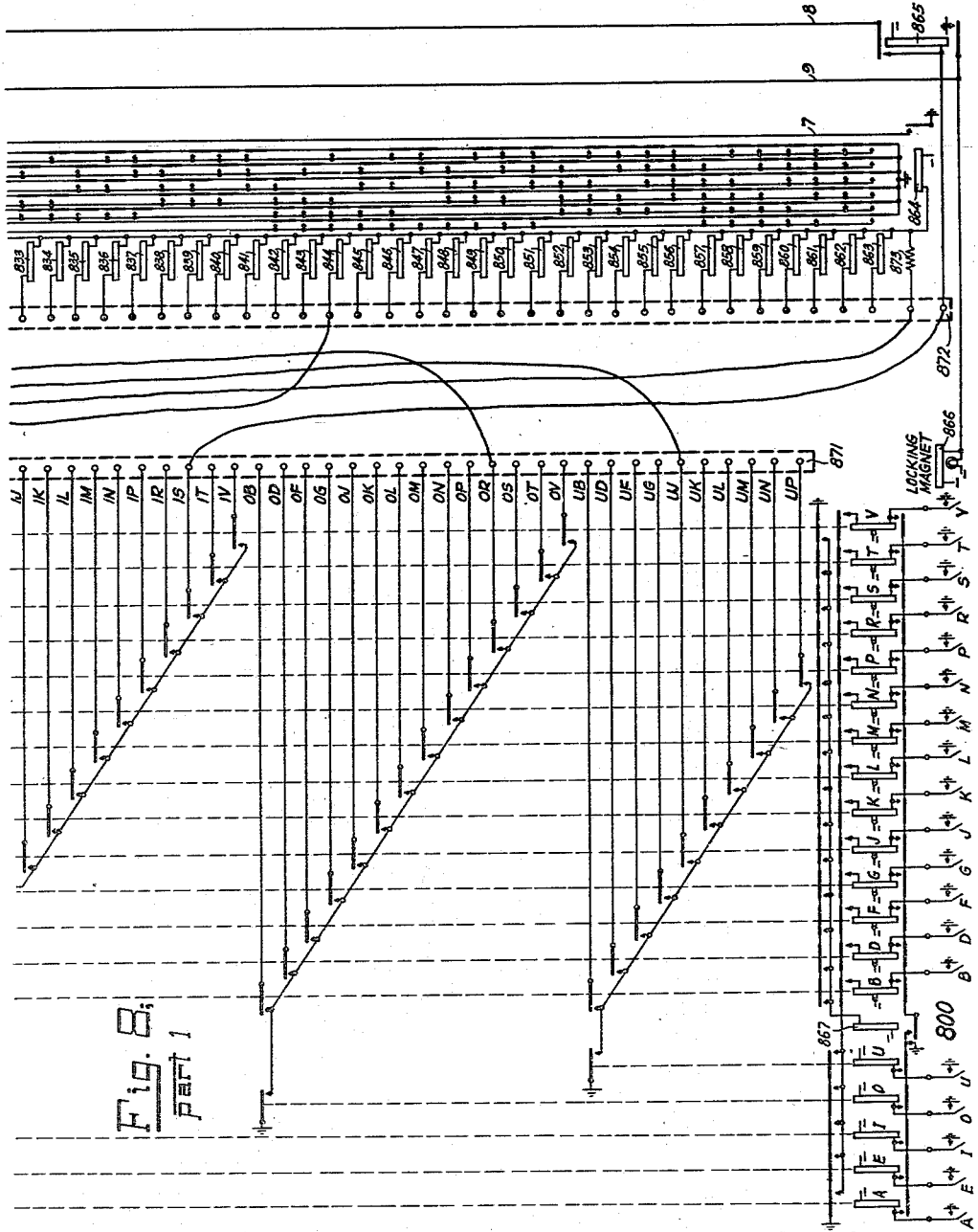

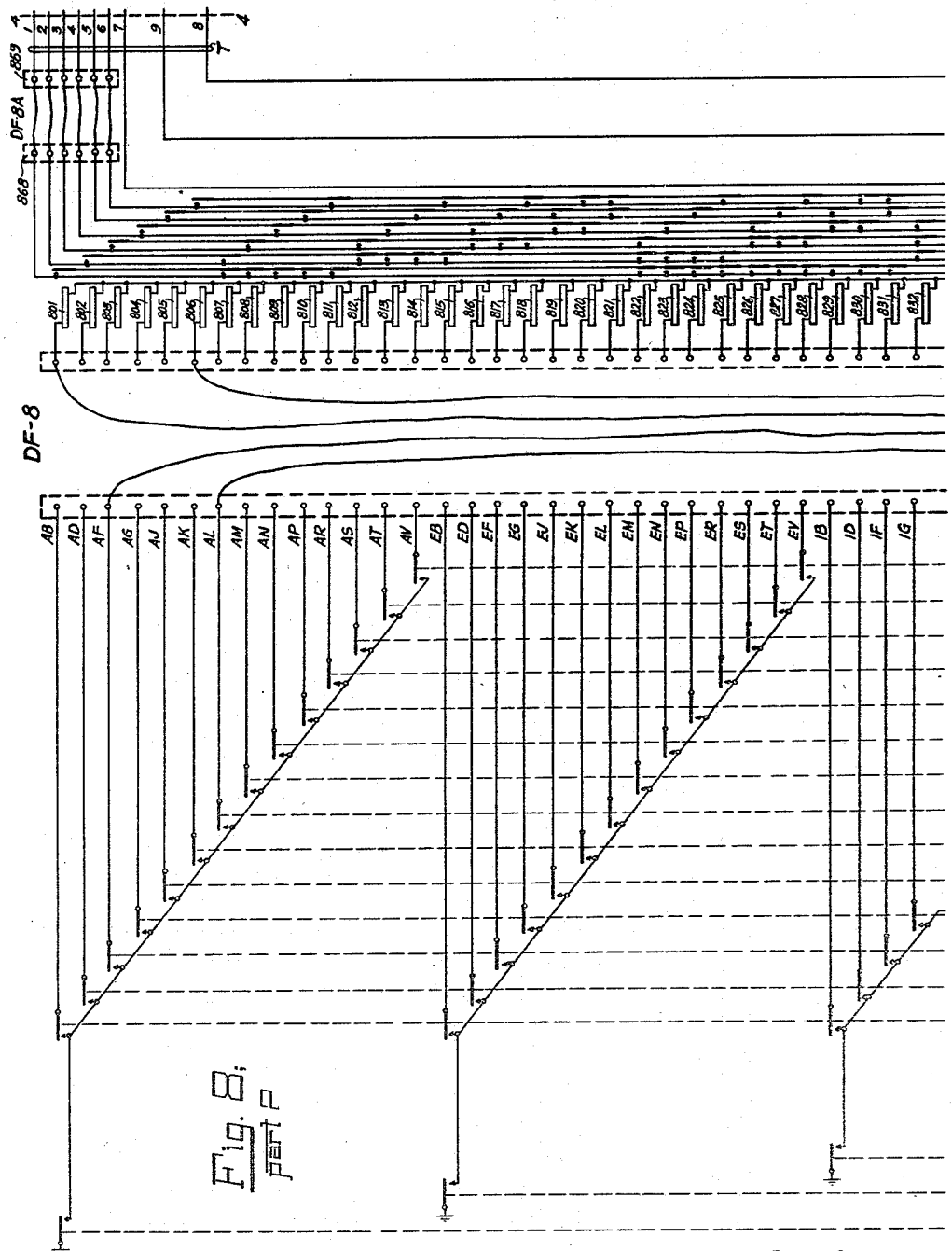

April 10, 1934.   J. I. BELLAMY   1,953,918
CRYPTOGRAPHIC SYSTEM AND APPARATUS
Filed March 28, 1932   12 Sheets-Sheet 11
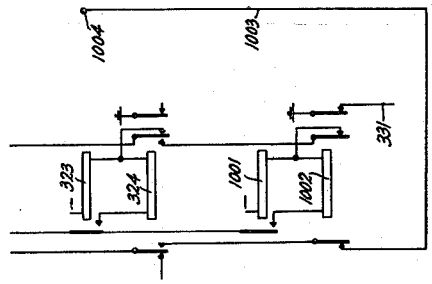
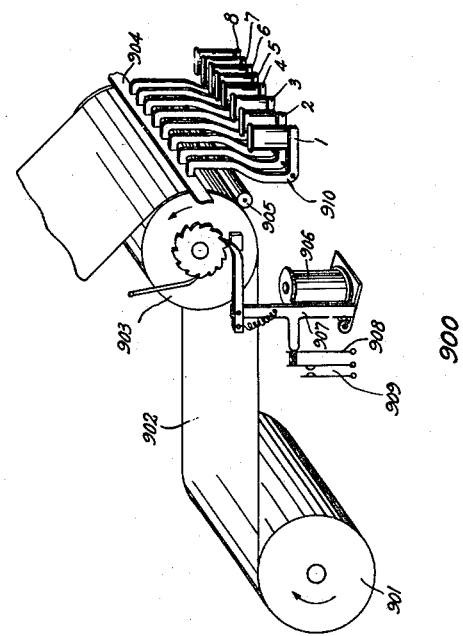
Inventor
John I. Bellamy
Wm Walter Owen
Atty.

April 10, 1934.   J. I. BELLAMY   1,953,918
CRYPTOGRAPHIC SYSTEM AND APPARATUS
Filed March 28, 1932    12 Sheets-Sheet 12
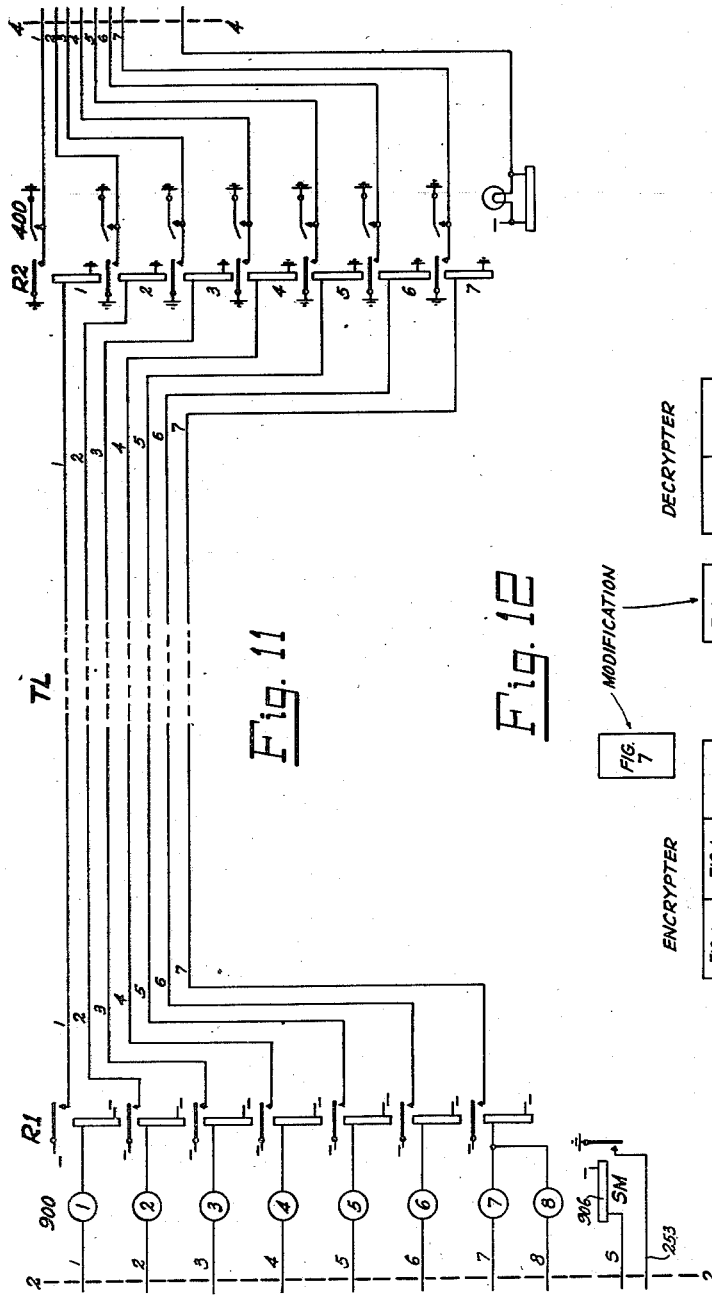
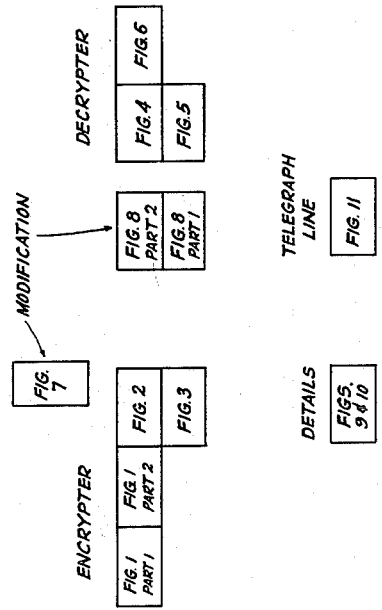
Inventor
John I. Bellamy
Atty.

Patented Apr. 10, 1934

1,953,918

UNITED STATES PATENT OFFICE 1,953,918

CRYPTOGRAPHIC SYSTEM AND APPARATUS

John I. Bellamy, Brookfield, Ill., assignor to Associated Electric Laboratories, Inc., Chicago, Ill., a corporation of Delaware Application March 28, 1932, Serial No. 601,479

33 Claims. (Cl. 178—22)

The present invention relates to ciphering or crytographic systems and apparatus, and the object is to provide a new and improved cipher or cryptographic system of great security, together with suitable apparatus for enabling messages to be readily enciphered and deciphered in accordance with the new and improved system of cryptography.

GENERAL DESCRIPTION

As is well-known by those skilled in the art of cryptography, a message to be transmitted in secrecy may be very simply enciphered by substituting a separate prearranged signal or character for each character of the message. This method, which is referred to as monographic substitution, while rather easy to employ, is not at all secure against discovery by any one who makes a determined effort to decipher the enciphered message.

By the use of digraphic substitution, the security of the message is increased many fold, but is still quite susceptible to being deciphered by skilled cryptographers in a reasonably short time. At the same time, the labor required in the routine work of enciphering and deciphering messages according to a digraphic system is greater than the labor involved in enciphering and deciphering messages according to the monographic system in about the same measure as the security of the message is increased.

In somewhat the same manner, as the number of letters grouped together in employing polygraphic substitution for the purpose of enciphering and deciphering messages is increased, the labor involved is increased directly with the increase in the number of letters or characters in a cipher group, and, therefore, directly with an increase in the security of the enciphered message.

Now, it will be apparent that there is no direct increase in the labor involved in enciphering and deciphering messages if these operations are performed automatically responsive to manipulation of keyboard apparatus similar to the keyboard of an ordinary typewriter. An object of the invention, therefore, may be stated to be specifically the production of a suitable system of cryptography and suitable mechanism for carrying it into effect whereby any desired message may be encrypted responsive to the manipulation of the keys of a keyboard in accordance with characters of the plain text of the message and whereby the message thus encrypted may be decrypted responsive to the manipulation of the keys of a keyboard in accordance with the characters or elements of the crypt text of the message.

An important feature of the invention is that the characters are each coded as they are set up by the successive key manipulations on the keyboard (a six unit code being employed), and that the code units of a predetermined number (four, in the illustrated example) are interchanged (enciphered) within the group of registered characters, thus forming an entirely different arrangement of code units, according to which the encrypted group of characters are delivered.

Another feature of the invention is that the cipher key, or enciphering constants, of the system may be changed very readily by the simple act of changing the connections of a small number of interconnecting conductors. Other objects and features will become apparent from the description which is to follow.

*Description of drawings*

Referring now to the accompanying drawings, comprising Figs. 1 to 11, these drawings show a sufficient amount of apparatus used in an encrypting and decrypting system embodying the features of the invention to enable the invention to be understood. More in particular, Figs. 1 to 3, show an encoding and enciphering device, referred to hereinafter as an encrypter;

Figs. 4 to 6 shows a deciphering and decoding device, referred to hereinafter as a decrypter;

Fig. 7 shows a modification of a portion of the encrypter;

Fig. 8 shows a modification of a portion of the decrypter to be used when Fig. 7 is used at the encrypter;

Fig. 9 is a view of the printing device employed in the encrypter of Figs. 1 to 3;

Fig. 10 is a modification of the circuit arrangement of Fig. 3 to be used in combination with Fig. 7;

Fig. 11 shows how the encrypter and decrypter may be connected together by means of a seven-conductor telegraph line so that the encrypted message may be transmitted directly by wire instead of by mail or messenger; and Fig. 12 is a layout drawing showing the way in which certain of the sheets of drawings should be assembled in order for the disclosure to be understood best.

The encrypter

Referring now to Figs. 1 to 3, the encrypter comprises a keyboard 100 having keys thereon arranged somewhat after the fashion of the keys on the keyboard of a typewriter; the printer 900, Figs. 2 and 9; and the associated relay apparatus and circuit connections indicated in Figs. 1 to 3. The keyboard of the encrypter has been shown only diagrammatically, as the particular mechanical construction is of no special concern in this disclosure. Each of the keys controls a pair of contacts, which contacts are shown in the drawings and correspond, respectively, to the letters of the alphabet, the digits 1 to 9 and 0, and certain indicated marks of punctuation. The keyboard 100 is provided with a locking magnet 244, which magnet may be energized to lock the keyboard so that no key may be actuated until the locking magnet is again deenergized. Any suitable or desirable mechanical construction, such as for example the construction employed in certain well-known printing-telegraph transmitters, may be employed to lock the keys against actuation.

The printer 900 (printer-1) preferably comprises a mechanism of the general type illustrated in Fig. 9 for printing combinations of characters in horizontal rows on a vertical movable strip of paper, and for advancing the paper one step following each printing operation. For the purpose of printing the characters, eight magnets, 1 to 8, are provided. Each magnet controls a type bar, such as the type bar 910, pivoted so as to force the ribbon 904 against the paper 902 and cause the corresponding character to be imprinted on the paper. The roller, or platen, 903 is provided with a ratchet wheel at one end arranged to be advanced step-by-step by the action of the pawl carried by the armature 907 of the spacing magnet 906. The roller 905 holds the paper 902 snugly against the platen 903 at a point below the typing position so that the paper is carried forward in the usual manner as the platen 903 is rotated step-by-step during a printing operation.

The spring 908 serves to restore the armature 907 after the magnet 906 has been energized, and to thereby cause the rotation of the roller and the advancement of the paper one vertical space. The contacts 909, associated with spring 908 through the medium of an insulating bushing, control an electrical circuit associated with the electrical apparatus of Figs. 2 and 3, as will be described hereinafter.

As will be hereinafter explained, the printer 900, Figs. 2 and 9, causes the code units of an encrypted message to be written in a vertical column on the paper 902 responsive to the actuation of the keys of the keyboard 100, Fig. 1. The eight separate characters which the printer is arranged to imprint on the paper are assumed to be the ciphers 1 to 8, but they may be, for example, the letters A to H of the alphabet.

Essentially, the encrypter comprises a keyboard controlled register group for registering the encoded characters of the desired message, sending apparatus for controlling the printing of the message in enciphered form, and a translating device or distributing frame interposed between the register group and the sending apparatus, whereby the registered characters of the message are enciphered and are delivered to the printer.

As shown in Figs. 1 to 3, the above-mentioned register groups comprise the character registers A to H, Figs. 2 and 3, which are controlled over the conductors 1 to 6 incoming to Fig. 2 from Fig. 1 by the relays 101—139, controlled in turn by the keys on the keyboard 100. The translator comprises the distributing frames DF—2 and DF—3, Figs. 2 and 3, whereat the conductors leading out from the registers A to H are suitably interchanged (in accordance with a prearranged system) with respect to the conductor groups $a$ to $h$, leading to the right from the right-hand side of the distributing frames DF—2 and DF—3. The sending apparatus for sending the encrypted message to the printer 900 includes the sender 200, Fig. 2, and the sender 300, Fig. 3, which senders are operable when characters of a message have been set up on the associated registering apparatus to control the printer, as will be described hereinafter.

For the purpose of transmitting the keyboard control from the keyboard 100 to the registers A to H, the controlling relays 101—139 are provided. These relays control the application of the code-unit combinations to the associated conductors 1 to 6 (a six-unit code being used). It is to be noted that these thirty-nine controlling relays are connected up so that each one of them places a separate one of the first thirty-nine of the possible sixty-four grounded conditions on the associated conductors 1 to 6. As before mentioned, each of the keys of the keyboard 100 is provided with a single contact pair for controlling one of these relays.

The distributing frame DF—1, composed of the terminal strips 141 and 142, having terminals between which jumpers may be run, is provided for the purposes of permitting any desired allocation of the thirty-nine code combinations to the thirty-nine keys of the keyboard, and thereby to the thirty-nine characters provided for. By an alteration of the arrangement of jumpers on the distributing frame DF—1, the code combinations assigned to the characters represented by the keys of the keyboard may be altered from time to time, as desired.

It is to be understood of course that the relays 101 to 139 may be omitted, together with the distributing frame DF—1, in which case the contacts now carried by the relays may be placed directly under the control of the respective keys of the keyboard so that, upon the manipulation of any key, the desired conductor combination is grounded directly. This somewhat simplified arrangement is inflexible, however, as regards making changes in the respective codes assigned to the keyboard characters.

Upon reference to the registers A to H, Figs. 2 and 3, it may be noted that each register includes six register relays, each register relay of a register corresponding to a separate one of the six units of the code. For the sake of simplicity, the register relays of registers A and H only have been shown.

For the purpose of connecting the incoming control conductors 1 to 6 with the registers A to H, successively, persuant to the registration of the successive characters in proper sequence, the connecting relays 201 to 204 are associated with the registers A to D, respectively, while the connecting relays 301—304 are associated with the registers E to H, respectively, Fig. 3. The connecting relays 201—204 are controlled by the transfer relays 205—208 of the registers A to D, respectively, while the connecting relays 301—304 are controlled by the transfer relays 305—308 of the registers E to H, respectively. As will be described more in detail hereinafter, the successive characters set up on the keyboard of Fig. 1 are registered on the registers A to H, respectively. The arrangement is such that the sender 200 (sender 1) starts to operate to deliver an encrypted polygraph corresponding to the first four characters of the message to the printer 900 as soon as the fourth character of the message has been registered on the register D, while the sender 300 (sender 2) starts to operate to deliver the second encrypted polygraph, corresponding to the second four characters of the message to the printer 900 as soon as the second four-character group of the message has been set up on registers E to H. Suitable interlocking arrangements are provided for preventing the two senders from operating at the same time and causing a mutilation of the encrypted message. With the characters being set up at a normal rate on the keyboard 100, the first polygraph set up will have been enciphered and delivered to the printer 900 by the time the second polygraph has been registered on the registers E to H, Fig. 3, so that the registers A to D may be released and immediately reoperated to register the third polygraph of the message. Similarly the registers E to H are released so that they register the fourth and each succeeding even-numbered polygraph of the message.

The decrypter

Referring now to Figs. 4 to 6, the decrypter will be described generally. It may be pointed out that the decrypter is in some respects similar to the encrypter, but it differs in that the keyboard 100, Fig. 1, of the encrypter is replaced in the decrypter by the smaller keyboard 400, comprising the keys 1 to 7 and the associated locking magnet 451. The code units of the encrypted message are set up on the keyboard in a manner to be explained more in detail hereinafter, with the result that the encrypted character groups appear alternately on the registers $a$ to $d$ and $e$ to $h$, Figs. 4 to 5. The distributing frames DF—4 and DF—5 are similar to the distributing frames DF—2 and DF—3 of the encrypter, but have the reverse function of deciphering the enciphered polygraphs into code-unit groups corresponding to the encoded polygraphs of the original message. The senders 400 and 500 are thus enabled to transmit the deciphered character groups of the message to the decoder and printer of Fig. 6 as the respective groups of encoded characters of the original message.

As will appear from the detailed description which is to follow, the apparatus of Figs. 4 and 5 undoes the work of the apparatus of Figs. 2 and 3, whereby the deciphered message is delivered to the apparatus of Fig. 6 in the same coded form in which it was received in the encrypter from the coding apparatus of Fig. 1. Therefore, it remains only for the printer of Fig. 6 to decode and print the deciphered characters of the message. More in particular, the relays 601 to 615 are caused to decode the coded characters received over conductors 1 to 6 of group P2 to operate the appropriate magnet of the printing mechanism 600 in each case, whereby each character of the plan text of the message is reproduced.

The mechanism of the printer 600 may be similar to the printing mechanism employed in "tape" printers used on the receiving end of telegraph lines. More in particular, the printer includes as many type bars as there are separate characters to be printed, and each type bar is provided with a separate magnet as shown. The spacing magnet 625 is provided for the purpose of advancing the tape following the printing of each character so as to provide the usual spacing between successive characters.

The modified system

In the encrypter and decrypter of Figs. 1 to 6, the printed message delivered by the printer of the encrypter for transmission to the decrypter consists of groups of suitable characters, letters or numerals for example, which have no apparent significance to any one who may handle the encrypted message. This may prove to be somewhat disadvantageous in case the encrypted message is to be recopied for transmission in the body of a letter or for transmission by regular telegraph channels; a message is less liable to error in case it consists of meaningful or pronounceable groups. To this end, Figs. 7 and 8 disclose modifications of the encrypter and decrypter, respectively. When the encrypter and decrypter are modified as shown in Figs. 7 and 8, the encrypted message is converted into a succession of two-letter combinations, each combination comprising a vowel and a consonant. These vowel-consonant combinations may be grouped into pronounceable words of any desired length, four-letter, five-letter, or eight-letter words, for example.

The modified encrypter

The modified encrypter embodies the modified printer, shown in Fig. 7, and including relays 1 to 6, controlled over conductors 1 to 6, respectively, of group P1, Fig. 2. These relays carry a contact pyramid which is arranged to apply an energizing potential to any one of sixty-four conductors, depending upon the particular permutation received on the six incoming controlling conductors. These sixty-four conductors are normally connected to a group of terminals which are cross-connected to the vowel printing magnets of the printing mechanism 700, while a switching relay 708 is provided to transfer the sixty-four actuating conductors to contacts which are connected to the consonant printing magnets of the printing mechanism 700. In this way, a separate two-letter, vowel-consonant combination or digraph may be assigned to each of the sixty-four possible code combinations representing an enciphered subgroup of an encrypted message.

The printing mechanism 700 may be mechanically similar to the printing mechanism 600, except that the vowel and consonant type bars are assumed to be adjusted to strike the tape at points one letter-space apart, so that a vowel may be printed at a given position on the tape, following which a consonant may be printed just to the right of the printed vowel before it is necessary to move the tape the space of two letters to the left in order to provide a new place for printing a new vowel-consonant combination. As will be explained more fully hereinafter, the spacing magnet 707 is arranged to operate only after a vowel and a consonant have been printed, thereby saving the time that would be required to advance the tape after the printing of each letter.

The modified decrypter

Referring now to Fig. 8, which shows a modification of the decrypter, the keyboard 400 is replaced by the apparatus of Fig. 8, the conductors T, Fig. 4, being suitably connected to the apparatus of Fig. 8 along the line 4—4, instead of to the keyboard 400. The apparatus of Fig. 8 includes the keyboard 800, which includes the keys corresponding to the same vowels and consonants which are arranged to be imprinted on the tape by the printing mechanism 700.

It is to be noted that a separate relay is provided for each of the keys at the keyboard 800. The relays associated with the vowel keys are arranged to lock operated and to remain operated until a consonant key has been depressed and released, whereby any one of the sixty-four associated vowel-consonant conductors can become energized, depending upon the particular vowel-consonant combination set up. The distributing frame DF—8 is provided to enable any vowel-consonant combination to be reverted into any desired code combination, being just the reverse of the function performed by the distributing frame DF—7. By this arrangement, when the enciphered message is set up on the keyboard 800 it is caused to reach the conductors 1 to 6 extending to the right from the relays 801—864 in the same manner in which it reaches the corresponding conductors 1 to 6, Fig. 7, from the encrypter sending mechanism.

Direct telegraphic transmission

Referring now particularly to Fig. 11, it may be pointed out that the repeaters R1 and R2 may be provided at the encrypter and decrypter, respectively, interconnected by the seven-conductor telegraph line TL, for the purpose of enabling the encrypted message to be transmitted telegraphically directly from the encrypter to the decrypter. As will be explained more in detail hereinafter, the printer 900 of the encrypter is interconnected with the repeater R1 in such a manner that the printer still operates to make a permanent printed record of the encrypted message, even though telegraphic transmission is provided for, whereby the encrypted message may be forwarded by mail or other means of communication for checking purposes.

DETAILED DESCRIPTION

The invention having been described generally, a detail description of the operation of the apparatus shown will now be given. For this purpose, it will be assumed that the apparatus is being used in the simple form illustrated in Figs. 1 to 6, and that a message is being transmitted, the first eight letters of which are N-O-W-C-O-M-E-S, corresponding to the words "now comes". In order to facilitate the rapid transmission of messages having a number of short words, the words of a message are transmitted without any additional spacing between successive words, as the cryptographic clerk at the decrypter may be depended upon to indicate the division of the letters of the decrypted message into words, as is common practice amongst telegraph operators receiving telegraph messages in Morse code.

Operation of the encrypter

In order to cause the characters of the message to be registered, the encrypting typist depresses the concerned keys of keyboard 100, Fig. 1, consecutively in accordance with the letters N, O, W, C, O, M, E, S, and so forth of the message. As the keys are operated, the characters of the message are placed in code in accordance with the following encoding table:

*Encoding table*

| | | |
|---|---|---|
| A—16 | N—34 | 1—245 |
| B—5 | O—4 | 2—156 |
| C—45 | P—15 | 3—136 |
| D—24 | Q—126 | 4—234 |
| E—124 | R—2 | 5—145 |
| F—134 | S—35 | 6—236 |
| G—25 | T—12 | 7—135 |
| H—6 | U—46 | 8—246 |
| I—123 | V—3 | 9—146 |
| J—23 | W—26 | 0—235 |
| K—1 | X—125 | .—256 |
| L—14 | Y—36 | ,—345 |
| M—56 | Z—13 | —346 |

Encoding and registering the message

When the key N, Fig. 1, is depressed, relay 16 is operated by way of its associated jumper on the distributing frame DF—1 (extending between the terminal strips 142 and 141 of the distributing frame). When relay 16 operates, it places a ground potential on the associated code conductors 3 and 4, so as to code the letter N in accordance with the foregoing encoding table.

At the register A, Fig. 2, connecting relay 201 is normally energized, as shown, through contacts of transfer relay 205 and by way of the lamp L1, while the lamp L2 is normally lighted to indicate to the operator that the encrypter is in normal condition for the receipt of a message. Accordingly, when ground potential is placed on code conductors 3 and 4, Fig. 1, relays 3 and 4 of the register A operate. Each relay grounds its associated conductor in the group extending to terminal strip 209 of the distributing frame DF—2, and it closes a locking circuit for itself in series with transfer relay 205, the left-hand terminal of which is connected to the normally grounded conductor 231, normally grounded at the left-hand contacts of relays 224 and 308. Transfer relay 205 does not operate immediately, however, because it is supplied with ground potential at both terminals.

When the operator releases the key N, thereby permitting relay 16 to restore and remove ground potential from the associated code conductors 3 and 4, the locking circuit for relays 3 and 4 of register A, Fig. 2, by way of transfer relay 205 becomes effective, whereby relay 205 operates and deenergizes connecting relay 201, at the same time energizing connecting relay 202 by way of contacts of transfer relay 206.

By the operations above-described, the letter N has been encoded and registered, and the registering apparatus has been made ready for the registration of the second encoded character of the message.

When the key O, Fig. 1, is depressed in accordance with the second letter of the message, relay 4 operates through the associated jumper to place ground potential on the fourth of the code conductors, thereby closing an operating circuit through contacts of the operated connecting relay 202 for the fourth register relay in register B. This fourth relay now operates and places a ground potential on the fourth one of the associated conductors extending to terminal strip 209, at the same time closing a self locking circuit through relay 206, which locking circuit becomes effective when the depressed letter key is released. When this occurs, relay 206 operates to restore connecting relay 202 to operate connecting relay 203.

In a similar manner, the remaining characters of the initial words "now comes" of the message are set up on the registers C, D, E, F, G, and H, Figs. 2 and 3. It will be understood, of course, that the transfer relays 207, 208, and 305—308 operate successively as the encoded letters are registered, and that the connecting relays 203, 204, and 301—304 are operated successively to render the registers successively effective; the preceding connecting relay releases in each case when a given connecting relay is operated, as may be readily observed.

The following table is given for the purpose of indicating the result of the encoding registering of the first two words of the message:

*Miscellaneous Table 1*

| Message letters | Registers | Code units |
|---|---|---|
| N | A | 34 |
| O | B | 4 |
| W | C | 26 |
| C | D | 45 |
| O | E | 4 |
| M | F | 56 |
| E | G | 124 |
| S | H | 35 |

*Enciphering the message*

As the letters of the characters of the message are encoded and registered, they are enciphered by polygraphs according to the arrangement given in the following enciphering table:

*Enciphering table*

| | |
|---|---|
| A1—a3 | E1—e3 |
| A2—a5 | E2—e5 |
| A3—d5 | E3—h5 |
| A4—b3 | E4—f3 |
| A5—c4 | E5—g4 |
| A6—d6 | E6—h6 |
| B1—d3 | F1—h3 |
| B2—a2 | F2—e2 |
| B3—c3 | F3—g3 |
| B4—b2 | F4—f2 |
| B5—a6 | F5—e6 |
| B6—c2 | F6—g2 |
| C1—a4 | G1—e4 |
| C2—c6 | G2—g6 |
| C3—b4 | G3—f4 |
| C4—d1 | Gr—h1 |
| C5—b5 | G5—f5 |
| C6—b1 | G6—f1 |
| D1—d4 | H1—h4 |
| D2—c5 | H2—g5 |
| D3—c1 | H3—g1 |
| D4—a1 | H4—e1 |
| D5—b6 | H5—f6 |
| D6—d2 | H6—h2 |

In explanation of the enciphering table, it may be pointed out that A1 to A6, B1 to B6, and so on, refer to the conductors 1 to 6 leading out from registers A, B, and so on, Figs. 2 and 3, to terminals on terminal strips 209 and 309 of the distributing frames DF—2 and DF—3. The conductor groups extending to the right from the distributing frames DF—2 and DF—3, are arranged in groups $a$ to $h$, six conductors to a group. The character combinations on the right-hand side of the enciphering table refer to these conductors on the right-hand side of the above-mentioned distributing frames. By comparing the enciphering table with the jumpers on the distributing frames DF—2 and DF—3, it will be noted that the conductors on the two sides of the frame are connected together in pairs in the more-or-less random order indicated in the encrypting table. It is to be understood that the order of connections is given merely for example and that this order may be changed from time to time when it becomes expedient or desirable to change the cipher key.

For convenience, the correspondence between the first eight characters of the message and the enciphered code units, as they appear in enciphered form (in two polygraphs) on the right-hand side of the distributing frames DF—2 and DF—3, just prior to the printing operation, is given in the following table:

*Miscellaneous Table 2*

| Message characters | Registers | Code subgroups | Enciphered code-unit subgroups | Cipher conductor subgroups | |
|---|---|---|---|---|---|
| N | A | 34 | 1 | a | |
| O | B | 4 | 1236 | b | First polygraph. |
| W | C | 26 | 6 | c | |
| C | D | 45 | 5 | d | |
| O | E | 4 | 46 | e | |
| M | F | 56 | 36 | f | Second polygraph. |
| E | G | 124 | 126 | g | |
| S | H | 35 | 1 | h | |

As indicated in the above table, cipher conductor 1 of subgroup $a$ is now in a grounded condition (receiving its ground potential through the associated jumper from conductor 4 associated with register D);

Conductors 1, 2, 3, and 6 of subgroup $b$ are energized over the associated jumpers;

Conductor 6 of subgroup $c$ is energized over the associated jumper;

Conductors 4 and 6 of subgroup $e$ are energized over their associated jumpers;

Conductors 3 and 6 of subgroup $f$ are energized over their associated jumpers;

Conductors 1, 2, and 6 of subgroup $g$ are energized over their associated jumpers; and Conductor 1 of subgroup $h$ is energized over its associated jumper.

*Printing the enciphered message*

As pointed out hereinbefore, the encrypter is arranged to encipher the message in four-letter groups, using what may be termed quadragraphic substitution. That being the case, as soon as the first four encoded letters have been registered on the registers A to D, Fig. 2, the sender 200 may be started to operate to transmit the first, composed of the first four groups of encrypted signal units, to the associated printer 900. For this purpose, when transfer relay 208 responds at the end of the registration of the fourth encoded letter, C, ground potential is placed on conductor 232 at the right-hand armature of the relay 208, thereby extending a ground potential by way of contacts of start relay 315 of sender 300 to start conductor 233 of sender 200. When start conductor 233 becomes grounded, start relay 215 of the sender operates and opens a point in the circuit of start relay 315 of sender 300 so as to prevent a premature starting of sender 300; closes a circuit through contacts of stepping relay 216 and contacts of transfer relay 218 for counting relay 217; and at the same time places ground on conductor 234 at its left-hand contacts. When start relay 215 of sender 200 operates and places ground on conductor 234, a locking circuit is prepared for counting relays 217—224 and an energizing circuit is closed through contacts of relays 216 and 218 for connecting relay 211, thereby operating connecting relay 211 at the same time that relay 217 operates through the inner right-hand contacts of relay 215. When connecting relay 211 operates it connects the conductors 1 to 6 of the associated cryptic subgroup, group a, to the corresponding conductors 1 to 6 leading to printing magnets 1 to 6 of the printer 900. As a result, an energizing circuit is closed for each of the magnets 1 to 6 of the printer 900 which is connected to a conductor of group a which has been previously energized. Upon referring to the table last given, it will be noted that only conductor 1 of group a is energized, from which it follows that printing magnet 1 becomes energized by current flowing over the associated conductor, while magnets 2 to 6 remain deenergized.

In addition to connecting up magnets 1 to 6 of the printer 900, relay 211 places an energizing potential on the associated conductor 7, thereby energizing magnet 7 of the printer. At the same time, relay 211 places an energizing potential on the associated spacing conductor S, thereby energizing the spacing magnet 906 of the printer.

Upon referring to Fig. 9, it will be evident that the energization of printing magnets 1 and 7 results in the characters 1 and 7 being imprinted on the paper 902 in the same horizontal line, the ink for printing purposes being carried on the ribbon 904. Also, it will be observed that spacing magnet 906 attracts its armature 907 when it becomes energized, so as to move the associated pawl into engagement with the next notch in the ratchet wheel, thereby preparing to rotate the platen 903 one step and carry the paper 902 one step to bring the next line under the type when the armature 907 is subsequently forced back to its normal position by the restoring spring 908.

By the foregoing operations, the code unit 1 has been printed in the first cipher subgroup on the paper 902, and the spacing unit or character 7 has been imprinted on the paper.

When the spacing magnet 906 operates, in addition to preparing to execute its spacing movement, it closes its contacts 909, thereby placing a ground potential on the stepping conductor 216. By this operation, stepping relays 216 and 316 are both energized. The energization of stepping relay 316 is without effect at this time, but the energization of the stepping relay 216 of the sender 200 results in an opening of the connecting relay circuit at the left-hand contacts of the relay and an opening in the stepping circuit at the right-hand contacts of the relay. When the connecting circuit is opened, connecting relay 211 deenergizes and disconnects the associated conductors 1 to 8, whereupon the energized ones of the printing magnets become deenergized.

The opening of the stepping circuit at the right-hand contacts of relay 216 results in the removal of the short-circuit from around the winding of counting relay 218, included in the locking circuit in series with counting relay 217 and the now-grounded conductor 234. When this occurs, relay 217 remains energized in series with relay 218, and relay 218 operates to transfer the connecting circuit to relay 212 and to transfer the stepping circuit to relays 219 and 220. It is to be noted, however, that these circuits are transferred at a time when they are both open.

As a further result of the deenergization of connecting relay 211, the circuit of stepping magnet 906 is opened, whereby stepping magnet 906 is caused to deactuate and rotate the platen 903, Fig. 9, one step, at the same time opening the circuit of stepping relay 216 at contacts 909. Stepping relay 216 now restores and recloses the connecting circuit and the stepping circuit, whereupon relays 219 and 212 energize through contacts of the operated transfer relay 218. Relay 219 locks itself in series with the transfer relay 220, so as to enable transfer relay 220 to operate when the stepping circuit is opened, and relay 212 connects up the conductors 1 to 6 of group b, at the same time energizing the associated conductors 7 and S. As a result, the code units 1, 2, 3, and 6 of the second cipher subgroup, in addition to the spacing character 7, are imprinted on the next line of the paper 902, and the spacing magnet 906 is energized at the same time to prepare to step the platen 903 to again place ground potential on conductor 253. As a result, stepping relay 216 is again energized to open the connecting circuit and to open the stepping circuit, whereupon connecting relay 212 falls back and transfer relay 220 energizes in series with counting relay 219 to transfer the connecting and stepping circuit to relays 213 and 221.

In the manner set forth above, the printer 900 operates responsive to the energization of connecting relay 213 to print the code unit 6, accompanied by the spacing character 7, as the third cipher subgroup, and the printer responds to the subsequent energization of connecting relay 214, (after transfer relay 222 has operated) to print the code unit 5, along with the spacing character 7, as the fourth cipher subgroup of the message. The relays 221 to 224 operate as explained in connection with relays 217 to 220.

*Clearing out registers A to D and sender 200*

When relay 224 energizes incidental to the printing of the fourth cipher subgroup of characters or code units, in addition to disconnecting relay 214 at its left-hand armature and opening a point in the stepping circuit at its inner right-hand armature, it removes ground potential at its right-hand armature from conductor 231, so as to release the operated register relays, as well as the transfer relays 205—208, of the registers A to D. This operation, however, is not effective to release these relays unless the second four-character group of the message has been encoded and registered on the registers E to H, as the operation of the connecting relays 301—304 of registers E and H, respectively, is dependent upon the transfer relays 205—208 being maintained operated. Accordingly, conductor 231 is also supplied with ground potential on the left-hand armature of relay 308 until relay 308 operates. As a result, responsive to the operation of relay 224 or to the operation of relay 308 (whichever happens last) conductor 231 becomes ungrounded and the transfer relays 205—208 restore. At the same time, connecting relay 201 again energizes through contacts of the associated transfer relay 205 and the associated signal lamp L1, whereupon the setting up of the third polygraph of the message may proceed.

When transfer relay 208 restores, it opens the circuit of start relay 215, whereupon start relay 215 deenergizes, thereby removing ground potential from conductor 234 and permitting relays 217—224 to become deenergized. At the same time, conductors 333 and 332 are joined at the right-hand contacts of start relay 215, thereby closing a point in the circuit of start relay 315. When this occurs, start relay 315 energizes over conductor 333, which obtains ground potential through the right-hand contacts of start relay 215 from conductor 332, now grounded at the right-hand armature of transfer relay 208.

Responsive to the energization of start relay 315, the connecting relays 311—314 are operated consecutively in the manner explained in connection with the connecting relays 211—214, and under the control of the counting relays 317—324, whereby the code units in the cipher subgroups of conductors $e$ to $h$, extending to the right from terminal strip 310 of the distributing frame DF—3 are imprinted on the paper 902 of the printer 900. It is to be noted that the connecting relays 311—314 energize conductor 8 (extending to magnet 8 of the printer) instead of conductor 7 (extending to magnet 7 of the printer) as in the case of the connecting relays 211—214 associated with the sender 200. By this arrangement, the digit 8 (or other desired character) is used as the spacing character following each of the cipher subgroups imprinted under the control of the sender 300. By this arrangement, the starting of a new polygraph is readily discernable by the operator at the decrypting machine, which becomes useful in case of a partially mutilated message.

For the sake of clarity, the following table shows what is imprinted on the paper 902 responsive to the first eight characters of the message having been set up on the keyboard 100:

*Miscellaneous Table 3*

| 1 |   |   |   |   |   | 7 |   |
|---|---|---|---|---|---|---|---|
| 1 | 2 | 3 |   |   | 6 | 7 |   |
|   |   |   |   |   | 6 | 7 |   |
|   |   |   |   | 5 |   | 7 |   |
|   |   |   | 4 |   | 6 |   | 8 |
|   |   | 3 |   |   | 6 |   | 8 |
| 1 | 2 |   |   |   | 6 |   | 8 |
| 1 |   |   |   |   |   |   | 8 |

*Clearing out registers E to H and sender 300*

When relay 324 operates at the end of the printing of the second cryptograph in addition to opening points in the connecting and stepping conductors at its left-hand and inner right-hand armatures, respectively, it removes ground potential from holding conductor 331 at its right-hand armature, thereby permitting transfer relays 305—308 to restore preparatory to the setting up of further registration in the registers E to H. It will be understood, of course, that the register relays 1 to 6 in each of the registers E to H release at the same time that the transfer relays 305—308 are released.

As a result of the deenergization of transfer relay 308, conductor 332 is ungrounded at the right-hand armature of relay 308, whereby start relay 315 restores and closes a point in the circuit of start relay 215 of the sender 200, in addition to ungrounded conductor 334 at its inner left-hand armature to permit relays 317—324 to restore.

It will be understood, of course, that the printing operation controlled by the sender 300 is ordinarily completed by the time the registers A to D, Fig. 2, have been re-operated to take on a setting in accordance with the third four-letter group of the message, so that the sender 200 may now start to operate again to print the polygraph corresponding to the third four-letter group of the message.

From a consideration of the drawings in connection with the description hereinbefore given, it will be apparent that the register groups A to D and E to H are effective alternately to take on registration corresponding to alternate four-letter groups, and that the senders 200 and 300 are effective alternately to correspondingly control the sender 900, whereby the entire message is printed in encoded enciphered form on the paper 902.

*Locking the keyboard*

In case the operator is unable to manipulate the keys of the keyboard 100 faster than the senders 200 and 300 can operate to cause the enciphered message to be printed, the locking magnet 144, Fig. 1, becomes operated, when eight encoded letters are set up on the registers A to H of Figs. 2 and 3, over conductor 326 and in a chain circuit including contacts of the operated relays 205—208 and 305—308. At the same time, the lamp associated with the locking magnet 144 becomes lighted to inform the operator that the keyboard is in locked condition. Since the magnet 144 is operated, the operator is unable to depress any one of the keys of the keyboard 100 until the sender 200 or the sender 300 has finished its operation to permit a group of the registers A to D or E to H to be released for a further setting. At the same time, the sequence lamps L1 to L8, Figs. 2 and 3, are all extinguished, serving as a further signal, by their unlighted condition, that the registers are all in use.

*Finishing an odd-length message*

In case the message contains a number of characters not divisible by four, a portion of a four letter group is set up on the register group of Fig. 2 or on the register group of Fig. 3. The operator may discover the condition of the registration at a glance by observing the lamps L1 to L8. If either the lamp L1 or the lamp L5 is in lighted condition, the message may be considered as completed. On the other hand, if one of the other lamps is lighted instead of the lamp L1 or the lamp L5, the operator depresses an arbitrary one of the keys on the keyboard 100 the proper number of times to complete the registration of the partially filled four-letter group, thereby enabling the concerned one of the senders 200 and 300 to operate to print the final polygraph group at the printer 900. This operation is necessary, it will be understood, because a complete group of four characters of a message must be registered before enciphering can be completed and consequent printing can take place.

*Operation of the decrypter*

After the encrypted message, as printed on the paper 902, has been transmitted to its destination, either by mail, messenger, or by telegraph, the received message is decrypted and restored to its original form by an operation of the decrypter, as will now be described. As will appear from the following description the decrypter first deciphers the polygraphs of the message, following which it decodes them, before printing them. The desiphering is according to the jumpering at the distributing frames DF—4 and DF—5, while the decoding is according to the jumpering at the distributing frame DF—6. The jumpers on the distributing frames of Figs. 4–6 are connected as given in two following tables:

Deciphering table

| | |
|---|---|
| a3—A1 | e3—E1 |
| a5—A2 | e5—E2 |
| d5—A3 | h5—E3 |
| b3—A4 | f3—E4 |
| c4—A5 | g4—E5 |
| d6—A6 | h6—E6 |
| d3—B1 | h3—F1 |
| a2—B2 | e2—F2 |
| c3—B3 | g3—F3 |
| b2—B4 | f2—F4 |
| a6—B5 | e6—F5 |
| c2—B6 | g2—F6 |
| a4—C1 | e4—G1 |
| c6—C2 | g6—G2 |
| b4—C3 | f4—G3 |
| d1—C4 | h1—G4 |
| b5—C5 | f5—G5 |
| b1—C6 | f1—G6 |
| d4—D1 | h4—H1 |
| c5—D2 | g5—H2 |
| c1—D3 | g1—H3 |
| a1—D4 | e1—H4 |
| b6—D5 | f6—H5 |
| d2—D6 | h2—H6 |

Decoding table

| | | |
|---|---|---|
| 16—A | 34—N | 245—1 |
| 5—B | 4—O | 156—2 |
| 45—C | 15—P | 136—3 |
| 24—D | 126—Q | 234—4 |
| 124—E | 2—R | 145—5 |
| 134—F | 35—S | 236—6 |
| 25—G | 12—T | 135—7 |
| 6—H | 46—U | 246—8 |
| 123—I | 3—V | 146—9 |
| 23—J | 26—W | 235—0 |
| 1—K | 125—X | 256—. |
| 14—L | 36—Y | 345—, |
| 56—M | 13—Z | 346—— |

The two polygraphs, consisting of cipher subgroups printed to correspond to the first eight letters of the message, have been given in tabulated form hereinbefore. As given in this table, the first polygraph consists of cipher subgroups: 17, 12367, 67, and 57. The operator accordingly starts to manipulate the keys of the keyboard 400 in accordance with the numbers in the above given subgroups and the following ones of the cipher text of the message.

Registering and deciphering the message

It is to be noted that connecting relay 401 of the decrypter is normally energized through contacts of transfer relay 405, and that the conductors 1 to 7 extending from the keyboard 400 are normally connected through the contacts of relay 401 to the relays 1 to 7 of register a. Therefore, relay 1 of register a energizes and locks itself to conductor 431, normally grounded by way of contacts of relay 424 and 508 and conductor 527, when the key 1 is depressed at the keyboard 400 in accordance with the first unit 1 of the first cipher subgroup of the message. Relay 1 also places ground potential on the associated conductor extending to the terminal strip 409 of the distributing frame DF—4.

The operator next depresses the key 7 at the keyboard 400 in accordance with the spacing unit of the first cipher subgroup, thereby closing a circuit for relay 7 of register a. When relay 7 operates, it locks itself to conductor 431 by way of transfer relay 405. As a result of this, transfer relay 405 operates in series with the associated relay 7 when the key 7 of keyboard 400 is released, thereby deenergizing connecting relay 401, and energizing connecting relay 402 through the contacts of transfer relay 406.

Responsive to the successive actuations of the keys of keyboard 400, relays 1, 2, 3, and 6 (not shown) of register b are actuated, following which relay 7 responds to the actuation of the seventh key, resulting in the energization of transfer relay 406 in series with relay 7 of register b when the key 7 is released. As a result of this, connecting relay 402 is deenergized, and connecting relay 403 is energized through the contacts of transfer relay 407.

In the register c, relay 6 (not shown) is energized before the energization of relay 7 results in the energization of transfer relay 407 (when key 7 is released) to cause relay 403 to restore and relay 404 to operate; while in register d the fifth relay is operated responsive to a manipulation of the fifth key at the keyboard 400, before the seventh relay is operated to cause an energization of transfer relay 408 (when the key is released) to bring about a deenergization of connecting relay 404 and energization of relay 501.

In setting up the fifth to eighth groups of cipher code units, the operator strikes the key 7 on the keyboard 400 for each digit 8, as it is considered unnecessary to provide separate keys for the spacing digits 7 and 8.

Upon reference to the table last given, it will be noted that the fourth and sixth register relays in register e are operated before the transfer-controlling seventh relay is caused to operate to bring about the operation of transfer relay 405; relays 3 and 6 in register f are operated; relays 1, 2, and 6 in register g are operated; and relay 1 in register h is operated before the respective relays 7 are caused to operate to control the operation of transfer relay 408.

The following table gives the result of the foregoing operations responsive to the keys of keyboard 400 being manipulated in accordance with the first eight cipher subgroups of code units composing the first two polygraphs of the message:

Miscellaneous Table 4

| Registers | Cipher code-unit subgroups | Deciphered code-unit subgroups | Code letters | Message subgroups | |
|---|---|---|---|---|---|
| a | 1 | 34 | N | A | |
| b | 1236 | 4 | O | B | First polygraph. |
| c | 6 | 26 | W | C | |
| d | 5 | 45 | C | D | |
| e | 46 | 4 | O | E | |
| f | 36 | 56 | M | F | Second polygraph. |
| g | 126 | 124 | E | G | |
| h | 1 | 35 | S | G | |

As will be seen upon inspecting the above table and upon inspecting the drawings, the energization of conductor 1 extending to the right from register a; the energization of conductors 1, 2, 3, and 6 of register b; the energization of conductor 6 of register c; and the energization of conductor 5 of register d, have resulted in the extension of energizing potentials by way of jumpers on the distributing frame DF—4 to conductors 3 and 4 of code subgroup A, associated with terminal strip 410 of the distributing frame DF—4; to conductor 4 of code sub-group B; to conductors 2 and 6 of code subgroup C; and to conductors 4 and 5 of code subgroup D. As a result, the plain text letters N, O, W, and C, forming the first polygraph are now set up in code form on the code subgroups A, B, C, and D, respectively, associated with terminal strip 410, forming the right-hand side of the distributing frame DF—4.

Similarly, it may be observed upon inspecting Fig. 5 and upon inspecting the above table that the placing of energizing potentials on conductors 4 and 6 extending to terminal strip 409 from register *e;* the placing of an energizing potential on conductors 3 and 6 of register *f;* the placing of energizing potentials on conductors 1, 2, and 6 of register *g;* and the placing of an energizing potential on conductor 1 of register *h* has resulted in an energizing potential being extended by way of jumpers on the distributing frame DF—5 to conductor 4 of the code subgroup E; the placing of energizing potentials on conductors 5 and 6 of code subgroup F; the placing of energizing potentials on conductors 1, 2, and 4 of code subgroup G; and in the placing of an energizing potential on conductors 3 and 5 of code subgroup H. As a result, the letters O, M, E, and S are now set up in code form on the conductors of code subgroups, E, F, G, and H, respectively.

*Decoding and printing the message*

The decoding and printing of the characters of the deciphered message may start as soon as the registers *a* to *d* of Fig. 4 have been set. When transfer relay 408 associated with register *d* operates, it connects the grounded conductor 527 to start conductor 433, by way of conductor 432 and contacts of start relay 515, of sender 500, thereby closing a circuit for start relay 415 of the sender 400. Start relay 415 now operates and closes a circuit at its right-hand armature for counting relay 417, at the same time placing ground potential at its left-hand armature on conductor 434. Relay 417 operates and locks itself to conductor 434 by way of relay 418. Relay 418, however, does not operate for the time being, because it receives the same potential at both terminals. As a result of ground potential being placed on conductor 434, connecting relay 411 operates through the left-hand contacts of stepping relay 416 and through the left-hand contacts of transfer relay 413. Upon operating, connecting relay 411 connects conductors 1 to 6 of code subgroup A with conductors 1 to 6 of group P2 leading to the printer of Fig. 6. Relay 411 also places a ground potential on control conductor 451 extending to the printing apparatus of Fig. 6.

In explanation of the decoding and printing operation now to take place, it may be pointed out that the decoding and printing apparatus of Fig. 6 is arranged to test combinations which the relays 101—139 of Fig. 1 are arranged to impress upon the associated conductors 1 to 6 under the control of the keys of keyboard 100, and to print the character corresponding to the code combination discovered to have been impressed on the conductors of the said group P2. Upon referring to Fig. 1, it will be noted that relays 122 to 139 each impress a separate three-unit code combination on the associated conductors, while the preceding relays 101—121 each impress a lesser number of code units, certain of them impressing two code units, while others impress only one code unit.

Pursuant to the printing operation, the apparatus in Fig. 6 first tests the conductors 1 to 6 of group T2 to determine whether or not three code units are present; and, if not, then to determine whether or not two code units are present; and finally to determine whether or not one code unit is impressed on the conductors. By using this progressive method of testing, simple relay apparatus suffices to select and operate the one of the printing magnets of the printer 600 which corresponds to the code combination set up on the conductors of group T2. The decoding and printing operation now follows in detail:

It is to be noted that relays 607—614 are double-wound relays. Each of these relays has a marginal adjustment such that both windings must be energized in order for the relay to operate. The windings of relays 607, 608, 609, and 610 are connected to conductors 1 and 2, 1 and 3, 1 and 4, and 1 and 5, respectively; the windings of relays 611, 612, and 613 are connected to conductors 2 and 3, 2 and 4, and 2 and 5, respectively; and the windings of relay 614 are connected to conductors 3 and 4. These conductor pairs correspond to the first two units of all the three-unit code combinations in use. As a result, if any three-unit combination it set up on the conductors of group T2, the one of the relays 607—614 which is connected to the two conductors corresponding to the first two units of the combination becomes operated (as both of its windings are energized) and connects the conductors corresponding to the third units of the concerned three-unit combination to the corresponding magnets of printer 600. In the present case, relay 614 is the relay to operate as the code combination set up on the conductors of group T2 is 23, and conductors 3 and 4 are energized as before pointed out. When relay 34 operates, it connects up the associated fifth and sixth conductors, thereby preparing circuits for the comma magnet and for the dash magnet of the printer. Neither the comma magnet nor the dash magnet is operated at this time, as neither of the conductors 5 and 6 is energized. The test of the conductors of group T2, therefore, for a three-unit code combination does not result in printing, and the test for a two-unit code combination is now made:

As pointed out hereinbefore, control conductor 451 extending to the printer is grounded by connecting relay 411 when this relay operates to start the decoding and printing of the first character of the message. Responsive to the grounding of conductor 451, timer relays 617—622 start to operate successively. Each of these relays is given an adjustment of predetermined stiffness, so that each relay takes a predetermined time in operating. By the time relays 617 and 618 have operated, sufficient time has elapsed to enable any character corresponding to three code units to have been decoded and printed and to enable relay 616 to have operated in series with the operated printing magnet to terminate the testing operation. Accordingly, since relay 616 has not operated by the time relay 618 operates, the latter relay closes a circuit for connecting relay 615. Relay 615 locks itself to conductor 454 at its left-hand armature, which conductor is grounded at the right-hand contacts of stepping relay 416. At its right-hand armatures, relay 615 connects relays 602—606 to conductors 1 to 5, respectively, of the group T2, whereby any one of these relays which corresponds to an energized one of the associated conductors 1 to 5 is caused to operate. Since conductors 3 and 4 are energized, relays 604 and 605 both operate. Relay 604 connects up conductors 4, 5, and 6 to contact on terminal strip 623 of the distributing frame DF—6, and relay 605 connects conductors 5 and 6 to contacts on the said terminal strip 623. The connecting up of conductors 5 and 6 by relays 605 is without effect at this time, as neither of the conductors 5 and 6 is deenergized. The connecting up of conductors 4, 5, and 6 by relay 604, however, results in a circuit being closed from the energized conductor 4 through the upper contacts of relay 604 and a jumper on the distributing frame DF—6 (extending between a contact of terminal strip 623 and the terminal of terminal strip 624) for printing magnet N. The printing magnet N thereupon actuates the associated type lever (not shown) and causes the character N to be imprinted on the associated paper tape (not shown). At the same time, relay 616 is operated in series with the magnet N. Upon operating, relay 616 opens a point in the circuit of the right-hand winding of relay 615, but relay 615 does not fall back at this time because it is locked to conductor 464 at its left-hand contacts. The breaking away of the armature of relay 616 from its resting contact also opens a point in the circuit of the lower winding of relay 601, thereby preventing a false operation of this relay at this time, which would otherwise ensue responsive to the subsequent operation of timer relay 620.

Relay 616 also closes a circuit for spacing magnet 625, which magnet now operates to prepare to rotate the platen (not shown) of the printer 600 in a manner similar to that illustrated in connection with the platen or roller of the printer 900, Fig. 9. Upon energizing, magnet 625, in addition to preparing to execute the well-known spacing operation, closes its contact shown to the left of itself, thereby placing an energizing potential on stepping conductor 453, connected to stepping relays 416 and 516 of the senders 400 and 500. The energization of relay 516 is of no effect at this time, but the energization of relay 416 results in the opening of the circuit of connecting relay 411 at the left-hand contacts of the relay and in the opening of the initial circuit of relay 417 at the right-hand contacts of the relay. Relay 411 now falls back, while relay 418, being no longer short-circuits, energizes in series with relay 417, thereby transferring the associated connecting and actuating conductors to relays 412 and 419. Stepping relay 416 also disconnects ground potential at its right-hand armature from locking conductor 454, thereby permitting relay 615 to deenergize and disconnect relays 602—606.

With relays 411 and 615 deenergized, relays 604 and 605, Fig. 6, both fall away. When relay 411 falls back and disconnects energizing potential from conductor 451, the energized ones of the relays 617—622 quickly deenergize successively. Because of the relatively stiff adjustment of the relays 617 to 622, the operated ones of these relays restore very much more quickly than any one of the relays can operate, with the result that the operation of these relays proceeds no further following the deenergization of conductor 451 upon the falling back of relay 411.

With relay 411 deenergized, the circuit of magnet N of the printer 600 and of relay 616 is open, whereupon the magnet N deenergizes and relay 616 restores. Relay 616 opens the circuit of spacing magnet 625, whereupon magnet 625 restores and causes the spacing operation to be performed, as it rotates the platen (not shown) one step. When magnet 625 restores, it removes ground potential from stepping conductor 453, whereupon stepping relays 416 and 516 restore.

When relay 416 restores, it replaces ground potential on conductor 454 at its right-hand armature; recloses the stepping circuit at its inner right-hand armature; and it recloses the connecting circuit at its left-hand armature. As a result, counting relay 419 is operated through contacts of the operated transfer relay 418, and connecting relay 412 is operated through contacts of the said operated transfer relay 418. Relay 419 locks itself in series with transfer relay 420, and relay 412 connects the associated conductors 1 to 6 of code group B to the corresponding conductors of group P2, at the same time reenergizing control conductor 451 to again start the time relays 617—622 into operation.

Upon referring to the immediately preceding table, it is to be noted that the fourth conductor in subgroup B is the only one energized, as the letter O is the one stored in subgroup B. That being the case, none of the relays 607—614 can operate, as each of them requires an energization of two windings for its operation.

When timer relays 617 and 618 have been operated, and relay 618 has brought about the energization of connecting relay 615, relays 602—606 are connected up as before to cause the printing apparatus to test for two unit combinations (the test for a three unit combination having failed). Since the fourth conductor of the group P1 is now energized, relay 605 operates over this conductor when it is connected up by relay 615, connecting up conductors 5 and 6 to terminals in terminal strip 623, but without effect at this time.

When the energization of relays 617 and 618 has been followed by the energization of relays 619 and 620 of the timing group, relay 620 closes an energizing circuit for connecting relay 601 (to start the testing for a single unit), whereupon relay 601 operates and closes a locking circuit for its upper winding by way of the grounded conductor 454, at the same time connecting the associated conductors 1 to 6 to terminals of the terminal strip 623. Since conductor 4 is energized, a circuit is now closed from this conductor through contacts 601 and by way of a jumper connected between terminals of strips 623 and 624 for magnet O of the printer 600. Magnet O is thereupon operated to cause the character O to be printed as the second character of the message.

Relay 615 is operated in series with the magnet O. It opens the initial circuit of the now-locked relays 601 and 613, at the same time closing a circuit for spacing magnet 625, which magnet operates pursuant to effecting the spacing operation. At its contact, magnet 625 energizes conductor 453, resulting in the hereinbefore mentioned operation of stepping relays 416 and 516. Relay 416 at its right-hand armature removes ground potential from conductor 454, permitting connecting relays 601 and 615 to restore. At its inner-right-hand armature, relay 416 again opens the stepping circuit, whereupon transfer relay 420 energizes in series with relay 419, while at its left-hand armature, relay 416 opens the circuit of connecting relay 412, permitting connecting relay 412 to deenergize and disconnect the conductors of subgroup B from group P2. The operated ones of relays 617—622 restore responsive to the removal of ground potential from conductor 451 at the upper armature of connecting relay 412. The spacing magnet 625 now restores to perform a spacing operation, at the same time removing ground potential from conductor 453 to open the circuit of stepping relays 416 and 516. When relay 416 falls back, connecting relay 413 operates over the connecting circuit, and counting relay 421 operates over the stepping circuit.

With the code units 26 and 45 set up on the subgroups C and D, respectively, the third and fourth letters, W and C, are printed in a manner similar to that pointed out in connection with the printing of the first character N of the message (responsive to code units 3 and 4 on subgroup A).

It will be understood, of course, that relay 422 operates upon the printing of the third character W, while relay 413 restores; that relays 423 and 414 operate at the commencement of the operations resulting in the decoding and printing of the fourth character C; and that relay 414 restores and relay 424 operates upon the printing of the fourth character C.

*Clearing out registers a to d and sender 400*

When relay 424 operates, it opens a point in the holding circuit of the registers a to d at its right-hand armature, by removing ground potential at one point from holding conductor 431. Therefore, responsive to the energization of transfer relay 424, or to the energization of transfer relay 508 associated with register h (whichever happens last), ground potential is removed at both points from holding conductor 431, permitting the operated relays and transfer relays of the registers a to d to restore. Connecting relay 401 is then operated again to enable the third polygraph of the message to be set up on the registers a to d.

When transfer relay 408 restores, it removes ground potential from conductor 432, and consequently from start conductor 433 of the sender 400, whereupon start relay 415 deenergizes and removes ground potential from the associated conductor 434. This latter operation permits relays 417—422 to restore. When relay 424 restores, it joins conductor 431 to the grounded conductor 527, thereby re-applying ground potential to holding conductor 431 again.

As a further result of the deenergization of start relay 415, start conductor 533 of the sender 500 is joined at the right-hand contacts of relay 415 to conductor 532, now grounded at the right-hand armature of transfer relay 508. Therefore, start relay 515 of sender 500 now operates, thereby operating relays 511 and 517 to start the printing of the second polygraph, consisting of the characters O, M, E, and S, and stored on the code subgroups E, F, G, and H.

The No. 2 sender of the decrypter, sender 500, now operates in the manner described in connection with the sender 400, the No. 1 sender, to control the printing apparatus of Fig. 6 to cause the characters O, M, E, and S, to be printed. The decoding and printing of the letter O responsive to the code unit 4 (now stored on code subgroup E) is accomplished as explained in connection with the decoding and printing of the second character O of the message, stored on code subgroup B. Similarly, the decoding and printing of the letters M and S, represented by code units 5 and 6, and 3 and 5 (stored in subgroups F and H, see the preceding table) is similar to the operations described in connection with the decoding and printing of the first, third, and fourth letters of the message. The letter E, the seventh letter of the message, is represented by three code units (1, 2, and 4). For this reason, the operations involved in printing the letter E will now be described.

*Printing a character represented by three code units*

After the letters O and M, stored on code subgroups E and F, Fig. 5, have been printed, counting relay 521 and connecting relay 513 are energized responsive to the deenergization of stepping relay 516, whereupon relay 513 connects up to the conductors of code subgroup G to the conductors of group P2, at the same time placing a ground potential on control conductors 451. Since conductors 1, 2, and 4 of code subgroup G are energized, relay 607 operates because its two windings are connected to energized conductors 1 and 2 of group P2, and relay 609 actuates because its windings are connected to energized conductors 1 and 4 of group P2. Relay 609 connects up the associated conductors 5 and 6, but this is without effect as neither conductor 5 nor conductor 6 is energized at this time. Relay 607 connects up conductors 3 to 6, of which only conductor 4 is energized. A circuit is now completed from the energized conductor 4, through contacts of relay 607, and by way of a jumper extending between terminals of strips 623 and 624 for magnet E of the printer 600. Magnet E and relay 616 both energize at this time, and the energization of magnet E results in the printing of the letter E.

*Clearing out registers e to h and sender 500*

When relay 524 of the sender 500 operates following the printing of the eighth character, S, in the message, it removes ground potential from the holding conductor 531 of the registers e to h, whereupon the energized relays associated with registers e to h are restored. When relay 508 restores, it removes ground potential from conductor 532, thereby deenergizing start relay 515 of sender 500. Start relay 515 now restores and removes ground potential from the associated holding conductor at its left hand armature, whereupon relays 517—524 restore, and relay 524 replaces holding potential on conductor 531 and its right-hand armature.

From the explanation hereinbefore given, it is believed that the way in which the remaining portion of the message is decrypted and printed it will be understood.

*Skipping a missing character*

Provisions have been made for printing an arbitrary character, an asterisk, for example, in case the printer 600 fails to print as a result of the regular decoding operation, such as described hereinbefore. The failure may be the result of a broken jumper wire on the distributing frame DF—6 or the result of an imperfect contact on one of the concerned relays, for example. In any event, if the regular printing operation does not take place by the time the energization of relays 617 to 620 has been followed by the energization of relays 621 and 622, relay 622 closes a circuit for the asterisk printing magnet in series with relay 616, causing an asterisk to be printed and permitting the following characters of the message to be printed in the usual way. The printing of the asterisk serves to notify the recipient of the message of the failure of the regular printing operation to take place.

*Locking the keyboard*

The locking magnet 451, connected in circuit with the associated signal lamp, is provided for the purpose of locking the keyboard 400 as described in connection with the locking of the keyboard 100, Fig. 1, at a time when all of the registers are in operated condition, and all of the transfer relays are consequently operated. Locking magnet 400, it will be noted, is controlled over conductor 526.

The register-unlock key

The characters 7 and 8 imprinted by the printing mechanism of the encrypter to serve as spaces between the cipher subgroups serve also to mark the beginning of the polygraphs of the message. It may happen occasionally that the registering portion of the decrypter, shown in Figs. 4 and 5, gets out of step with the message, possibly because of an error in the message as transmitted to the decrypter. At any rate, the registering apparatus of the decrypter may be restored to normal at any time by an operation of the unlocked key 528, which key removes ground potential from conductor 527 when it is operated. Holding conductors 431 and 531 receive their energizing potential from conductor 527. As a result, when the key 528 is operated, the energizing potential is removed from holding conductors 431 and 531, permitting the registering apparatus of Figs. 4 and 5 to clear out and restore to the normal condition shown in the drawings. It will be observed that the cryptographic clerk is able to tell which of the registers are in operated condition by observing the lighted or unlighted condition of the lamps L associated with the connecting relays 401—404 and 501—504.

The modified system

The encrypter and decrypter of Figs. 1 to 6 having been described, a description will now be given of the operation of the encrypter and decrypter as modified according to Figs. 7 and 8, respectively. As has been explained hereinbefore, the apparatus of Fig. 7 is used in conjunction with the encrypter of Figs. 1 to 3, to convert the cipher subgroups into two-letter, vowel-consonant combinations in order to shorten the message and in order to make the encrypted message susceptible of being formed into pronounceable groups, while the apparatus of Fig. 8 reverts the two-letter vowel-consonant combinations into the original cipher subgroup and delivers them to the decrypting apparatus of Figs. 4 to 6.

The modified encrypter

When the encrypter is to be modified in accordance with the disclosure in Fig. 7, the conductors extending up across the line 2—2, Fig. 2, are to be joined at this line with the corresponding conductors extending down to the line 2—2 of Fig. 7. At the same time, the sender 300, Fig. 3, is modified as shown in Fig. 10 to include the additional counting relays 1001 and 1002, which operate following the operation of counting relays 323 and 324 to permit an additional printing operation to be performed before the ground potential is removed from conductor 331 to bring about the release of the registers E to H. It is to be noted that the added conductor 1003 is provided, as shown in Fig. 10, extending to terminal 1004. This conductor is to be extended to relay 703, Fig. 7, by connecting terminal 1004 of Fig. 10 with terminal 1004, Fig. 7.

As will be recalled, and as may be seen upon observing Fig. 1, and the encoding table hereinbefore given, only thirty-nine of the possible sixty-four combinations are impressed on the code conductors controlled by the relays of Fig. 1, as only thirty-nine separate keys are employed at the keyboard 100. However, after the code combinations have been registered on the registers of Figs. 2 and 3 and enciphered in accordance with the cross-connections on the distributing frames DF—2 and DF—3, with various combinations arising in the transmission of messages, and with various arrangements of jumpers on the distributing frames DF—2 and DF—3, a cipher subgroup of code units, as represented by the cipher-conductor subgroups a to h, Figs. 2 and 3, may comprise any one of the sixty-four combinations of the six code units, ranging from all units absent to all units present. Therefore, the relays 1 to 6, Fig. 7, have been arranged to impose any one of sixty-four conditions on the associated printing apparatus, so as to effect the printing of any one of sixty-four separate two-letter vowel-consonant combinations, (or "digraphs") each corresponding to a separate cipher subgroup. As indicated by the letters applied to the terminals of terminal strip 710 of the distributing frame DF—7, the vowels A, E, I, O, and U have been chosen, while the consonants chosen are B, D, F, G, J, K, L, M, N, P, R, S, T, and V. In the assumed example, the correspondence between cipher code combinations and digraphs is as given in the following conversion table:

*Conversion Table*

| | | |
|---|---|---|
| 1—UJ | 124—AK | 1245—UM |
| 2—AT | 125—OF | 1246—EP |
| 3—EG | 126—IM | 1256—IR |
| 4—IF | 134—EN | 1345—EK |
| 5—OB | 135—IT | 1346—OD |
| 6—OR | 136—AB | 1356—ON |
| 12—IL | 145—IG | 1456—UB |
| 13—UD | 146—AD | 2345—OJ |
| 14—IN | 156—AS | 2346—OL |
| 15—EB | 234—AG | 2356—EM |
| 16—OM | 235—UL | 2456—IV |
| 23—AM | 236—OT | 3456—EJ |
| 24—ES | 245—UF | 12345—UN |
| 25—ET | 246—IK | 12346—AP |
| 26—OK | 256—AR | 12356—EL |
| 34—IJ | 345—IP | 12456—ER |
| 35—OV | 346—EV | 13456—AV |
| 36—OS | 356—OP | 23456—UK |
| 45—AN | 456—UG | 123456—OG |
| 46—EF | 1234—IB | (all blank)—AF |
| 56—UP | 1235—AJ | space—IS |
| 123—ED | 1236—AL | |

The particular arrangement of the conversion table, it may be pointed out, is clearly arbitrary, as the assignment of the vowel-consonant combinations to the respective code-unit combinations may be altered from time to time as desired by altering the jumpers extending between terminal strips 709 and 710 of the distributing frame DF—7. Only a few jumpers are shown in place, but it is assumed that the terminals left vacant are jumpered in accordance with the above conversion table.

At the end of the conversion table, it will be noted that it is indicated that a space is converted into the vowel-consonant combination IS. The explanation for this item of the table will be given subsequently.

For the purpose of explaining the operation of the modified encrypter and decrypter, it will be assumed that the same message hereinbefore considered is being set up on the modified encrypter, the first eight characters of the message being the letters of the words "NOW COMES". It will be recalled that the apparatus of Figs. 1 to 3 delivers the enciphered code units of the first two four-letters polygraphs in the following sub-groups:

Miscellaneous Table 5

```
        1
        1236
        6
        5

46
        36
        126
        1
```

Upon referring to the conversion table hereinbefore given, it will be seen that the enciphered sub-groups of code units are to be converted into digraphs as indicated in the following table:

Miscellaneous Table 6

```
    1—UJ
    1236—AL
    6—OR
    5—OB

46—EF
    36—OS
    126—IM
    1—UJ
```

The detailed operation follows:

Converting the enciphered message

When the sender 200 is started by an application of ground potential to conductor 233 as hereinbefore described, start relay 215 operates, closing circuits for relays 217 and 211 as hereinbefore described. Relay 217 locks itself to conductor 234 in series with transfer relay 218, and relay 211 connects up the conductors of a cipher subgroup $a$ to conductors 1 to 6 of group P1, now extending through the distributing frame DF—7A to the relays 1 to 6 of Fig. 7. Since conductor 1 of subgroup $a$ is the only one energized at this time (see Miscellaneous Table 5), relay 1 is the only relay energized. Upon energizing, relay 1 prepares a circuit path through contacts of relays 2 to 6 to conductor 1, extending to an armature of relay 708. It is to be noted that the conductors extending from the contacts of relay 6 to the armatures of relay 708 bear labels indicating the combination of relays 1 to 6 operated when the respective conductors are energized.

At the same time that it connects up conductors 1 to 6 of cryptic subgroup $a$, relay 211 energizes conductor S of group P1, closing a circuit for the slow-to-operate relay 704. Relay 704 is rendered slow to operate by virtue of its upper winding being connected in a local circuit through the inner upper contacts of the relay.

After an interval which is sufficiently long to permit the operation of any of the relays 1 to 6 of Fig. 7 that are to operate, relay 704 operates and closes a circuit for relay 705 at its lower armature, which relay is also slow to operate. At its inner upper armature, relay 704 breaks the local circuit of its upper winding so as to prevent the relay from being slow to release, while at its upper armature it places an energizing potential through the upper armature and resting contact of relay 705 on the apex of the contact pyramid carried by relays 1 to 6. With ground potential thus placed on the armature of relay 1, a circuit is closed through the operated armature of relay 1 and its working contact, armatures of the unoperated relays 2 to 6, code-combination conductor 1, an armature of relay 708 and its resting contact to the associated terminal of strip 709, and through a jumper of the distributing frame DF—7, extending between this terminal and a terminal on strip 710 to the printing magnet U. Magnet U now operates to imprint the vowel U.

After an interval sufficiently long to permit the vowel to be printed as above explained, the slow-operating relay 705 responds to the operation of relay 704. At its inner armature, relay 705 opens the local circuit of its upper winding so as to render the relay quick-releasing, and at its upper armature it closes a circuit for relay 708.

Relay 708 now operates and shifts the sixty-four code conductors extending to its armatures from the base of the contact pyramid carried by relays 1 to 6 from the sixty-four vowel terminals on strip 709 to the sixty-four consonant terminals on the same strip. Since ground potential is still applied to code-combination conductor 1, extending to the right from the base of the contact pyramid, a circuit is closed by way of this conductor, the associated operated armature of relay 708, and a jumper on the distributing frame DF-7 to the consonant printing magnet J. Magnet J is now energized to imprint the consonant J immediately following the vowel U.

At the same time, the spacing magnet 707 is energized through the lower armature of relay 708 to prepare to execute the spacing operation of the printer 700 upon its subsequent deenergization. Magnet 707 places a ground potential on conductor 253, thereby energizing the stepping relays 216 and 316 of the senders 200 and 300. The energization of stepping relay 216 results in the energization of transfer relay 218 of the sender 200 in series with relay 217 and in the deenergization of connecting relay 211. When connecting relay 211 energizes, in addition to disconnecting conductors 1 to 6 of the cipher subgroup $a$ from conductors 1 to 6 of group P1 extending to the equipment of Fig. 7, it removes ground potential from conductor S, thereby permitting relays 703, 704, and 708 to deenergize successively.

Spacing magnet 707 deenergizes responsive to the deenergization of relay 708, thereby advancing the platen (not shown) the space of two characters, and removing ground potential from conductor 253 and permitting the stepping relays 216 and 316 to restore.

When stepping relay 216 restores, it recloses the stepping circuit and the connecting circuit, whereupon relays 219 and 212 energize through contacts of the operated transfer relay 218. Connecting relay 212 connects the conductors 1 to 6 of group $b$ to the corresponding conductors of group P1, and at the same time places ground potential on conductor S, thereby causing the printing apparatus of Fig. 7 to operate as above described to print the vowel-consonant combination AL, corresponding to the cipher subgroup of code units 1236.

In the manner described above, the successive digraphs OR and OB, and EF, OS, IM, and UJ are printed, as called for by Miscellaneous Table 6.

Printing the spacing digraph IS

When the stepping relays 216 and 316 restore following the printing of the eighth vowel-consonant digraph IL, counting relays 317—324 of sender 300 having operated, transfer relay 1001, Fig. 10, (of the pair of relays comprising relays 1001 and 1002, now added to the sender 300) operates and closes a locking circuit for itself in series with transfer relay 1002. At the same time, a circuit is closed through the left-hand contacts of stepping relay 316 of the sender 300, and by way of the left-hand contacts of the operated transfer relays 318, 320, 322, and 324, contacts of the unoperated transfer relay 1002, and over conductor 1003, for relay 703. When relay 703 operates, it prepares a circuit at its upper armature for printing the spacing digraph IS, while at its inner armature it applies a ground potential to conductor S to cause the relays 704, 705, and 708, as well as the spacing magnet 707 to go through their operations hereinbefore given. The vowel magnet I is operated over a jumper on the distributing frame DF—7, through the upper contacts of relays 704 and 703, and through the inner-upper armature and its resting contact of relay 708. After relay 708 operates, the consonant printing magnet S is operated through the working contact of the inner-upper armature of the relay. The spacing digraph IS is always printed at the end of two polygraphs, corresponding to eight letters or characters of the message. By this arrangement, the cryptographic clerk at the decrypter is able to know just where to start a message in case the first part of it is missing or in case she wants to verify a portion of the message without putting the entire message through the decrypter.

For the purpose of clarity, it may be pointed out that the printer 700, in response to the manipulation of the keys of keyboard 100 in accordance with the first two words "NOW COMES" of the message has imprinted the following: "UJALOROBEFOSIMUJIS".

*The modified decrypter*

When an encrypted message which has been converted into two-letter vowel-consonant combinations or digraphs is received at the decrypting station, whereat a decrypter is provided with the modified keyboard and associated apparatus of Fig. 8, joined to conductor group T along the line 4—4, the operator sets up the vowel-consonant combinations on the keyboard 800, whereupon the message is reverted, decrypted, decoded, and printed in its original form on the printer 600, as will now be described:

As has been pointed out hereinbefore, and as may be observed upon inspecting Fig. 8, the keyboard 800 is provided with a separate key for each of the vowels and consonants arranged to be printed by the printer 700. Each of the keys of keyboard 800 is arranged to operate a relay, and the contacts of the vowel and consonant relays are interconnected so as to supply potential to the sixty-five terminals in terminal strip 871 on the left-hand side of the distributing frame DF—8. On the right-hand side of the distributing frame DF—8, sixty-five relays are provided, 801—865. The relays 801—864 are arranged to impress the sixty-four code combinations, respectively, on the associated conductors 1 to 6, being arranged and connected in regular order, as may be observed. Relay 865 is a special spacing-control relay, controlled whenever the spacing digraph (IS, in the example illustrated) is set up on the keyboard 800. The terminals on the strips 871 and 872, forming the two sides of the distributing frame DF—8, are cross-connected in accordance with the following reversion table, which is simply the reverse of the conversion table hereinbefore given:

*Reversion Table*

| | | |
|---|---|---|
| UJ—1 | AK—124 | UM—1245 |
| AT—2 | OF—125 | EP—1246 |
| EG—3 | IM—126 | IR—1256 |
| IF—4 | EN—134 | EK—1345 |
| OB—5 | IT—135 | OD—1346 |
| OR—6 | AB—136 | ON—1356 |
| IL—12 | IG—145 | UB—1456 |
| UD—13 | AD—146 | OJ—2345 |
| IN—14 | AS—156 | OL—2346 |
| EB—15 | AG—234 | EM—2356 |
| OM—16 | UL—235 | IV—2456 |
| AM—23 | OT—236 | EJ—3456 |
| ES—24 | UF—245 | UN—12345 |
| ET—25 | IK—246 | AP—12346 |
| OK—26 | AR—256 | EL—12356 |
| IJ—34 | IP—345 | ER—12456 |
| OV—35 | EV—346 | AV—13456 |
| OS—36 | OP—356 | UK—23456 |
| AN—45 | UG—456 | OG—123456 |
| EF—46 | IB—1234 | AF—(all blank) |
| UP—56 | AJ—1235 | IS—space |
| ED—123 | AL—1236 | |

When the cryptographic clerk at the decrypter receives the message under consideration, the first two words of the plain text of which are the hereinbefore considered words "NOW COMES", which have been encoded, encrypted, and converted into the two letter combinations "UJ, AL, OR, OB, EF, OS, IM, UJ, IS" hereinbefore given, she sets up the converted text on the keys of the keyboard 800:

*Reverting and registering the message*

When the operator strikes the vowel key U, the associated relay U operates and locks itself at its lower armature through the normally closed contacts controlled by the armature of relay 867. At its inner-upper armature, relay U prepares a locking circuit for any consonant relay which may become operated. The relay U also prepares a circuit at its upper armature for extending ground potential to any one of the conductors UB, UD, UF, etc. having a designation beginning with the vowel U.

When the operator depresses the consonant key J, relay J operates and closes a locking circuit for itself at its inner-upper armature through contacts of the vowel relay U; it prepares a new circuit for the vowel relay U at its lower armature, and it closes a circuit for relay 867. When relay 867 operates, it closes a new locking circuit for the vowel relay U, which includes the contacts of the consonant key, lower contacts of relay J, armature of relay 867, and the lower armature of relay U. Relay 867 opens the initial locking circuit of relay U at the same time, but relay U remains operated over the new locking circuit above traced, as long as the key J remains depressed. Relay J also closes an armature associated with the contacts of each of the vowel relays A, E, I, O, and U. Since only the vowel relay U is operated, the operation of the armatures of relay J associated with the other vowel relays is without effect.

With relays U and J both operated, ground potential is extended to the UJ conductor, leading to a terminal on terminal strip 871, closing a circuit by way of a jumper on the distributing frame DF—8 for code relay 801. Relay 801, corresponding to the first code combination, 1, of the sixty-four possible code combinations, energizes and places a ground potential on the associated code conductor 1 extending to the registers a to h, Figs. 4 and 5. When this occurs, relay 1 of register *a* operates and locks itself to the grounded holding conductor 431, thereby recording the first cipher subgroup of the message.

At the same time, relay 864 is energized in series with relay 801, placing a ground potential on the associated conductor 7, thereby closing a circuit for transfer-control relay 7 of register *a*. Relay 7 now operates and closes a locking circuit for itself in series with transfer relay 405, but relay 405 does not operate until the circuit of relay 7 is broken.

When the operator releases the consonant key J, the initial operating circuit of relay J is broken, as is the locking circuit of relay U. Relay J, however, does not release immediately responsive to its initial circuit being opened, as it remains locked in a circuit including its inner-upper armature and the inner-upper armature of relay U. When relay U releases, it opens a point in its own previously established locking circuit at its inner-lower armature, and at its inner-upper armature it opens the locking circuit of relay J, whereupon relay J restores and permits relay 867 to restore, whereupon the operator may proceed to set up the next digraph, AL.

With relays U and J restored, the circuit for relay 801, as well as the circuit for the common series relay 864, is opened. As a result, relays 801 and 864 both restore. When relay 864 restores, it removes ground potential from the associated conductor 7, thereby opening the initial circuit of relay 7 associated with register *a*. By this operation, the short-circuit is removed from around the winding of transfer relay 405, whereupon relay 405 operates in series with relay 7, and disconnects connecting relay 401, at the same time connecting up connecting relay 402, as hereinbefore described.

As the operator proceeds to set up the succeeding vowel-consonant digraphs on the keyboard 800, the concerned relays of Fig. 8 are operated, causing the concerned ones of the relays of registers *b, c, d, e, f, g,* and *h* to become operated to store the characters (the first two polygraphs) of the message. The following table gives the first eight digraphs, together with the cipher code combinations which they cause to be set up on the registers *a* to *h*, Figs. 4 and 5:

*Miscellaneous Table 7*

UJ—1
AL—1236
OR—6
OB—5

EF—46
OS—36
IM—126
UJ—1

When the spacing syllable IS is set up on the keys I and S of the keyboard 800, relays I and S cooperate to extend ground potential to the IS conductor leading to terminal strip 871, closing a circuit over the associated jumper for relay 865. When relay 865 operates, it closes a circuit for keyboard-locking magnet 866 and for the associated signal lamp, thereby locking the keys of the keyboard 800 against further actuation for the time being. Relay 865 also closes a point in a locking circuit for itself at its upper contacts, which locking circuit (if closed) includes the associated conductor 8 and the armature of the operated transfer relay 405 of the register *a*. By this arrangement, if the registers *a* to *d* have not been cleared out to take the code combinations corresponding to the first four letters of the second group of eight letters of the plain text of the message, relay 405 (in operated condition) maintains conductor 8 grounded, thereby maintaining a locking circuit for relay 865 so as to maintain the locking magnet 866 operated until the registers *a* to *d* have been cleared out. Therefore, in case the operator has erred in setting up the message and has not set up all of the preceding digraphs the locking magnet 866 is caused to maintain the keyboard continuously locked until the operator discovers her error and operates the unlock key 528, Fig. 4, to release the operated registering apparatus, so that she may start the mutilated group of digraphs through the decrypter again. The presence of the spacing syllable IS in the encrypted message has other advantages hereinbefore enumerated.

It is to be noted that the locking magnet 866 is arranged to be operated over the associated conductor 9, in the manner explained in connection with the locking magnet 451 of the keyboard 400, whenever all of the registers *a* to *h* are in use.

*Routine changes*

It is quite conceivable that, given sufficient time, and, given sufficient encrypted messages, unauthorized persons may eventually succeed in learning the "key" so that they can decrypt encrypted messages. Moreover, unauthorized persons may gain access to the encrypter or to the decrypter, and thereby discover the specific steps employed to encrypt messages at the encrypter, or an untrustworthy or indiscreet employee may be enticed or tricked into divulging the secrets of the cryptographic system to unauthorized or unscrupulous persons. In order to minimize the effect of this "leakage", changes may be made from time to time in the encrypter to renew the secrecy.

If desired, a monographic substitution may be made at the distributing frame DF-1 associated with the keyboard 100, by re-arranging the jumpers thereat. As mentioned hereinbefore, the security of a system of monographic substitution by itself is very slight. However, it is believed that the security of such a substitution is very greatly increased when followed by the enciphering operation hereinbefore described, even though the specific details of the enciphering operation be known. It will be understood, of course, that the jumpers on the distributing frame DF-6 in the decrypter will need to be re-arranged to conform with the changed arrangement of jumpers on the distributing frame DF-1 of the encrypter.

The main reliance for security, of course, is placed on the distributing frames DF-2 and DF-3. At desired intervals, the jumpers on these distributing frames may be re-arranged, thereby re-arranging the cipher key, or enciphering system. The distributing frame DF-3, it should be kept in mind, may have an entirely different arrangement of jumpers from the arrangement of the distributing frame DF-2, instead of having the same arrangement as shown in the drawings, whereby the security of the encrypted message is materially increased. This increase in security, however, is partially offset by the fact that the message may be handled as composed of eight letter groups at the decrypter instead of as being composed of four letter groups, as will be understood. It will be understood, of course, that the distributing frames DF-4 and DF-5 of the decrypter must have their jumpers re-arranged in accordance with the new arrangement of jumpers at the distributing frames DF-2 and DF-3, respectively.

A simple method of making a substitution which offers a fair degree of security consists in shifting the order of the conductors 1 to 6 incoming to the registers of Figs. 2 to 3, or of the conductors 1 to 6 outgoing from the senders 200 and 300 to the printer. Means is provided for making the latter substitution in the modification of the encrypter formed by substituting Fig. 7 for the printer 900 of Fig. 2. In Fig. 7, the conductors 1 to 6 incoming from the senders 200 and 300 pass through the distributing frame DF-7A, having terminal strips 701 and 702. At this distributing frame, the jumpers may be arranged in any one of 720 different combinations, which number is the product of the factors 6, 5, 4, 3, 2, and 1. A similar distributing frame, DF-8A, Fig. 8, is provided in the modified decrypter, on which the jumpers have an arrangement corresponding to the arrangement of the jumpers on the distributing frame DF-7.

When the modified encrypter and decrypter are being used, advantage may be taken of the opportunity afforded by the distributing frame DF-7 to make any desired new assignment of vowel-consonant digraphs to the received encrypted code combinations. It will be understood, of course, that a corresponding re-arrangement of the jumpers of the distributing frame DF-8 must then be made, the change necessitating a new conversion table and a new reversion table. It is to be noted that the security afforded by alterations of the jumpers on the distributing frames DF-7 and DF-8 is of the order of the security afforded by alterations of the jumpers on the distributing frames DF-1 and DF-6.

*Direct telegraphic transmission*

If desired, a telegraph line may be extended between the printer 900, Fig. 3, of the encrypter and the keyboard 400, Fig. 4, of the decrypter, as is shown in Fig. 11. The interconnecting telegraph line TL is a seven-conductor line, having six conductors corresponding to the six code units, respectively, and a seventh conductor arranged to be used to mark the spacing between the consecutive subgroups of encrypted code units.

It is to be noted that the telegraph line TL extends from the repeater R1, associated with the encrypter, to the repeater R2, associated with the decrypter. The first six relays of the repeater R1 are connected in series with the printing magnets 1 to 6 of the printer 900, respectively, while the seventh relay of the repeater R1 is connected in the common current-supply conductor of printing magnets 7 and 8, so that it is actuated whenever either of the spacing magnets is operated. When any one of the relays of the repeater R1 operates, it transmits current over the associated conductor of the telegraph line T1, thereby operating the corresponding relay of the repeater R2. The relays of the repeater R2 are arranged to control the associated code unit conductors 1 to 6 and the spacing conductor 7 in the same way that these conductors are controlled by the keys of the keyboard 400.

It is apparent that the printer 900 functions to print the encrypted message in the manner hereinbefore described, notwithstanding the interconnecting telegraph line, and that the keyboard 400 is still operable to control the decrypter. In this way, if desired, the message may be transmitted telegraphically in encrypted form over the telegraph line TL, while a copy of the printed encrypted message may be transmitted in any desired way to the decrypter to be decrypted, as a check on the message as transmitted telegraphically.

It is obvious that the speed of operation at the encrypter must be regulated so that the units of the encrypted message are not transmitted more rapidly over the telegraph line TL than they can be taken care of by the decrypter.

It will be understood, of course, that the rather elementary telegraph line TL may be replaced by any suitable or desired form of multiplex or stop-start printing telegraph line, as the six unit code employed in the encrypter and decrypter is quite commonly used in printing telegraph systems.

*Delivering the encrypted message in a five unit code*

If it is desired to employ a five unit code in delivering the message from the encrypter of Figs. 1 to 3, instead of the six unit code, the cipher groups of twenty-four units each (associated with the senders 200 and 300) may be subdivided into five subgroups of not more than five units each, instead of into four subgroups of six units each (subgroups *a* to *h*). The first four subgroups of a cipher group may contain five units, while the fifth subgroup contains four units, making a total of twenty-four. This new division is accomplished by simply providing two more counting relays at each sender, together with one additional connecting relay, such as the connecting relays 211 to 214 and 311 to 314. The registers of the decrypter may be correspondingly changed to include two register groups of five registers each, each register containing five register relays with the exception of the fourth and eight, which may contain only four register relays.

With this modified arrangement, the message, as delivered to the printer 900 may be transmitted over a plain telegraph line wherein the five unit code is employed. If this is done, the so-called "Case Shift" (heretofore found to be unavoidable in five-unit operation) is no longer necessary, as is self evident.

What is claimed is:

1. In an encrypter, register groups arranged to register polygraphic character groups, respectively, means for encoding the characters of the polygraphic groups prior to their registration, means for making a polygraphic substitution for each registered polygraph of the message, the substitution being different for each separate polygraph unless such polygraph be identical with another polygraph, in which case the substitution may be identical, and means for transmitting the substituted polygraphs.

2. In an encrypter, two register sets, means for operating said register sets alternately to take on settings corresponding, respectively, to alternate polygraphic groups of the plain text of a message to be encrypted, means for enciphering each registered polygraph, sending means, and means for operating said sending means to transmit each enciphered polygraph.

3. In a decrypter, two register sets, each arranged to register a polygraph of an encrypted message, means for setting up successive polygraphs of an encrypted message on said register sets alternately, a printer, decoding apparatus associated with said printer, and means effective each time a polygraph of a message is set up on one of said registers for deciphering the polygraph and delivering it in deciphered form to said decoding apparatus, said decoding apparatus being effective to decode the deciphered characters of the polygraph, and means for operating said printer to print the decoded characters.

4. In an encrypter, means for encoding the successive characters of the plain text of a message and for registering the encoded characters in polygraphic groups, means for making a polygraphic substitution for each polygraph of the encoded message, whereby successive cipher polygraphs are obtained, each cipher polygraph comprising a cipher group composed of subgroups of code units, a printer arranged to print digraphs, and means for operating said printer to print a group of digraphs for each cipher polygraph, wherein the digraphs correspond, respectively, to the cipher subgroups of code units of the cipher polygraphs.

5. In a crytographic printer, means for reducing the characters of a message to successive subgroups of code units varying in value, and means for printing a separate digraph for each separate value of a subgroup of code units.

6. The method of encrypting a message which consists in encoding the successive characters of the message, enciphering the successive polygraphs of the encoded characters according to their code units, and in converting the enciphered subgroups of code units into digraphs.

7. The method of decrypting an encrypted message appearing in digraphic form, which consists in reducing the successive digraphs to subgroups of code units, polygraphically deciphering the subgroups of code units, and in decoding the deciphered subgroups of code units into the respective characters of the plain text of the message.

8. In combination, a group of code conductors, relays associated with said conductors, each relay having contacts thereon arranged to energize a separate combination of said conductors when the relay is actuated, and means including a keyboard having contact-making keys thereon for selectively and successively actuating said relays.

9. In combination, a group of code conductors, relays associated with said conductors, each relay having contacts thereon arranged to energize a separate combination of said conductors when the relay is actuated, means including a keyboard having contact-making keys thereon for selectively and successively actuating said relays, there being a separate one of said keys for each of said relays, and a distributing frame interposed between said keys and said relays having facilities for making jumper connections thereon, whereby any desired correspondence between the said keys and said relays may be effected and altered from time to time as desired.

10. In combination, two groups of registers, a group of conductors incoming to said registers, the conductors of said group corresponding to the units, respectively, of a preassigned code, means for operating said registers successively over said conductors to store characters received in code, sending apparatus arranged to transmit intelligence in accordance with the setting of said registers, means for starting said sending apparatus to transmitting intelligence in accordance with the setting of the first group of registers responsive to the completion of the setting of the said first group, whereby the setting of the second group of registers proceeds while the sending apparatus is operating in accordance with the setting of the first group, and means dependent jointly upon the sending apparatus completing its operation in accordance with the setting of the registers of the first group and the setting of the last register in the second group for starting the sending apparatus to transmit intelligence in accordance with the setting of the registers of the second group.

11. In combination, two groups of registers, a group of conductors incoming to said registers, the conductors of said group corresponding to the units, respectively, of a preassigned code, means for operating said registers successively over said conductors to store characters received in code, sending apparatus arranged to transmit intelligence in accordance with the setting of said registers, means for starting said sending apparatus to transmitting intelligence in accordance with the setting of the first group of registers responsive to the completion of the setting of the said first group whereby the setting of the second group of registers proceeds while the sending apparatus is operating in accordance with the setting of the first group, and means dependent jointly upon the completion of the sending of intelligence in accordance with the setting of the registers of the first group and the setting of the final register in the second group for restoring the registers of the first group to enable them to take on an additional setting.

12. In combination, two groups of registers, a group of conductors incoming to said registers, the conductors of said group corresponding to the units, respectively, of a preassigned code, means for operating said registers successively over said conductors to store characters received in code, sending apparatus arranged to transmit intelligence in accordance with the setting of said registers, means for starting said sending apparatus to transmitting intelligence in accordance with the setting of the first group of registers responsive to the completion of the setting of the said first group, whereby the setting of the second group of registers proceeds while the sending apparatus is operating in accordance with the setting of the first group, and means dependent jointly upon the completion of the transmission of intelligence in accordance with the setting of the registers of the first group and the setting of the final register in the second group for placing the registers of the first group under the control of said incoming conductors again.

13. In combination, two groups of registers, a group of conductors incoming to said registers, the conductors of said group corresponding to the units, respectively, of a preassigned code, means for operating said registers successively over said conductors to store characters received in code, sending apparatus arranged to transmit intelligence in accordance with the setting of said registers, means for starting said sending apparatus to transmitting intelligence in accordance with the setting of the first group of registers responsive to the completion of the setting of the said first group, whereby the setting of the second group of registers proceeds while the sending apparatus is operating in accordance with the setting of the first group, and means dependent jointly upon the completion of the transmission of intelligence under the control of the registers of the first group and the setting of the final register of the second group for clearing out the registers of the first group for a further setting and for starting the sending apparatus to transmit intelligence under the control of the registers of the second group, whereby the registers of the first group may be reset while the intelligence stored on the registers of the second group is being sent out.

14. In combination, two groups of registers, a group of conductors incoming to said registers, the conductors of said group corresponding to the units, respectively, of a preassigned code, means for operating said registers successively over said conductors to store characters received in code, sending apparatus arranged to transmit intelligence in accordance with the setting of said registers, means for starting said sending apparatus to transmitting intelligence in accordance with the setting of the first group of registers responsive to the completion of the setting of the said first group, whereby the setting of the second group of registers proceeds while the sending apparatus is operating in accordance with the setting of the first group, means dependent jointly upon the completion of the transmission of intelligence under the control of the registers of the first group and the setting of the final register of the second group for clearing out the registers of the first group for a further setting and for starting the sending apparatus to transmit intelligence under the control of the registers of the second group, whereby the registers of the first group may be reset while the intelligence stored on the registers of the second group is being sent out, and means responsive to the completion of the sending of intelligence in accordance with the setting of the registers of the second group, and independent of whether the registers of the first group have been reset or not for clearing out the registers of the second group to receive a further setting as soon as the registers of the first group have been completely reset.

15. In combination, two groups of registers, a group of conductors incoming to said registers, the conductors of said group corresponding to the units, respectively, of a preassigned code, means for operating said registers successively over said conductors to store characters received in code, sending apparatus arranged to transmit intelligence in accordance with the setting of said registers, means for starting said sending apparatus to transmitting intelligence in accordance with the setting of the first group of registers responsive to the completion of the setting of the said first group, whereby the setting of the second group of registers proceeds while the sending apparatus is operating in accordance with the setting of the first group, means dependent jointly upon the completion of the transmission of intelligence in accordance with the setting of the registers of the first group and the setting of the final register of the second group for again placing the registers of the first group in condition to receive a further setting, and means effective whenever the final register of the second group receives its setting before the completion of the transmission of intelligence in accordance with the setting of the registers of the first group, and remaining effective until such transmission has been completed, for preventing further setting information from being received over said incoming conductors.

16. In a cryptographic device, groups of code conductors, registers associated with said code conductors and arranged to energize the conductors of said groups so as to impress a separate character in code on each group of conductors, other groups of conductors, the number of conductors in said other groups equaling the number of conductors in the first named groups, the conductors in the two groups being joined together, respectively, in a predetermined random order, a sending device including a separate connecting relay for each of said other groups, means effective when said registers have been operated to impress code combinations on the conductors of the first-named groups for operating said sending apparatus, said sending apparatus being effective when operated to actuate said connecting relays successively, whereby intelligence is transmitted depending upon the potentials impressed on the conductors of the respective said other groups.

17. In a cryptographic system, a digraph printer having a group of printing magnets, each magnet corresponding to a separate character, a group of incoming code conductors over which successive code combinations are received, a group of code-combination conductors, each of said conductors corresponding to a separate code combination arranged to be received over said incoming code conductors, means controlled over said code conductors for impressing an energizing potential on the one of said code-combination conductors which corresponds to the instant code combination, primary printing terminals and secondary printing terminals, and means effective when a code combination is received over said incoming conductor for connecting said code-combination conductors with said primary and secondary printing terminals successively, and conductors connecting said primary and secondary printing terminals with said printing magnets, whereby a digraph is printed each time an incoming code combination is received.

18. In a cryptographic device for translating digraphs into single characters or monographs, respectively, a group of relays corresponding, respectively, to the initial digraphic characters, a second group of relays corresponding, respectively, to the second digraphic characters, a group of relays corresponding, respectively, to the monographic characters into which the digraphs are to be translated, and a separate circuit for each of the monograph relays jointly controlled by a different combination of a relay of the first named group and a relay of the second named group.

19. In a cryptographic device, two groups of manually operable keys, a group of conductors corresponding, respectively, to pairs of said keys, each of said pairs including a key of the first group and a key of the second group, and means effective whenever the operation of the key in the first group is followed or accompanied by an operation of a key in the second group for energizing the one of said conductors which corresponds to the operated pair of keys.

20. In a cryptographic device, two groups of manually operable keys, a group of relays corresponding, respectively, to pairs of said keys, each of said pairs including a key of the first group and a key of the second group, and means effective whenever the operation of a key in the first group is followed or accompanied by an operation of the key in the second group for energizing the one of said relays which corresponds to the operated pair of keys.

21. In a cryptographic device for reducing digraphs to monographs, a keyboard having keys which may be actuated to set up digraphs, a group of relays containing a separate monograph relay for each digraph to be set up on said keys, and means responsive to the actuation of a pair of said keys in accordance with the characters of a digraph for selecting and actuating the one of said relays which corresponds to such digraph.

22. In a cryptographic device for reducing digraphs to monographs, a keyboard having keys which may be actuated to set up digraphs, a group of relays containing a separate monograph relay for each digraph to be set up on said keys, means responsive to the actuation of a pair of said keys in accordance with the characters of a digraph for selecting and actuating the one of said relays which corresponds to the digraph set up, a group of code unit conductors associated with said monograph relays, and means controlled by each of said relays for impressing a distinctive code combination on said conductors when it is actuated, whereby said translated monographs are placed in code.

23. In a cryptographic device arranged to register the characters of a message in polygraphic groups, means for causing the separate characters of the polygraphs to be registered successively and for automatically clearing out the registering apparatus in regular order, an unlocking device, and means responsive to the actuation of said unlocking device when an incomplete polygraph is set up on said registering apparatus for clearing out said registering apparatus.

24. In an electrically controlled decoder and printer arranged to decode and print characters successively received in code over a group of incoming conductors, said conductors corresponding, respectively, to the units of the code, means effective each time a character in code is received over said incoming conductors for making successive tests of said conductors for code combinations of the respective possible numbers of code units, starting with the highest and progressing towards the lowest number, and means effective as soon as the impressed combination of code units is discovered in the course of testing for halting the testing operation and for printing the character corresponding to the discovered code combination.

25. In a decoding device arranged to decode coded characters received successively over a group of code conductors corresponding, respectively, to the units of the code, a group of relays for testing the code conductors for three-unit combinations, a second group of relays for testing the code conductors for two-unit combinations, and means for rendering the first group of relays effective to test for a three unit combination before the second group of relays is rendered effective to test for a two unit combination, whereby two units of an impressed three unit combination are not interrupted as the two units of a two unit combination.

26. In combination, a decoder arranged to decode characters received in code over a group of incoming conductors corresponding, respectively, to the units of a code and to impress each decoded character on a separate conductor of corresponding value, a group of relays corresponding, respectively, to the first units of two unit code combinations, means for connecting said relays to certain of said incoming conductors, respectively, whereby any one of said relays may be actuated over the conductor to which it is connected when a code combination is received, and contacts on each of said relays effective when the associated relay is actuated to connect the concerned ones of the said character conductors to the incoming code conductors corresponding to the respective possible second units of the code combinations having a first unit corresponding to the one assigned to the conductor to which such relay is connected.

27. In a decoding and printing device arranged to decode characters received in code and print the decoded characters, means effective when the printing device fails to print when an incoming character combination is received for actuating said printing device to print an arbitrary character to indicate that such failure occurred.

28. In a cryptographic system, an encrypter having a controlling keyboard thereon corresponding to the characters of the plain text of a message to be encrypted, a printer having type bars corresponding, respectively, to characters or character units of the cipher text of the message, and means responsive to the actuation of the keys of said keyboard in accordance with the successive characters of the plain text of a message to be encrypted for operating the type bars of said printer in combinations to print the characters or character units of the cipher text in horizontal subgroups, each succeeding subgroup being printed beneath the preceding subgroup, whereby the imprinted ciphered text characters or character units are in column form.

29. In an encrypting machine, a controlling keyboard having keys thereon corresponding to the characters of the plain text of a message to be encrypted and delivered in subgroups, a printing mechanism having means for printing the subgroups of characters of the cipher text of the message, and means for causing said printer to imprint an arbitrary spacing character in association with each subgroup of cipher-text characters, whereby the subgroups of cipher-text characters are maintained separated.

30. In a cryptographic system, a printer arranged to automatically print digraphs in the course of the cryptographic handling of messages, spacing means for periodically advancing the medium onto which the digraphs are printed, and means for operating said spacing mechanism only after both characters of a digraph have been imprinted.

31. In a cryptographic system, an encrypter arranged to be actuated in accordance with the characters of a message to be encrypted and to make a polygraphic substitution, means for printing the cipher text in polygraphic groups, and means automatically effective to insert an arbitrary designation at intervals to indicate the finishing of one polygraphic group or the beginning of another one, whereby the decrypting of a message is facilitated, as in case only a part of a message is received or if a message is mutilated.

32. In a telegraph system, a telegraph transmitter associated with a telegraph line, said transmitter having a keyboard on which the characters of a telegraph message to be transmitted may be set up successively, and means in said telegraph transmitter for making a polygraphic substitution before transmitting characters over the telegraph line in correspondence with the characters set up on the keyboard, whereby there is no respective correspondence between the characters transmitted over the telegraph line and the characters of the plain text of the message set up on the keyboard, thereby insuring secrecy.

33. In a combined telegraph and cryptographic system, a printing-telegraph receiver arranged to receive messages transmitted thereto in cipher form over a telegraph line, the characters of the plain text of the message transmitted having undergone polygraphic substitution, a printing mechanism at the receiver for reproducing the characters of the plain text of the message, and means in said receiver for making a reverse polygraphic substitution to cause the received cipher text to be printed as the plain text of the message.

JOHN I. BELLAMY.